US010546472B2

(12) United States Patent
Alberth, Jr. et al.

(10) Patent No.: US 10,546,472 B2
(45) Date of Patent: Jan. 28, 2020

(54) THERMOSTAT WITH DIRECTION HANDOFF FEATURES

(71) Applicant: Johnson Controls Technology Company, Auburn Hills, MI (US)

(72) Inventors: William P. Alberth, Jr., Prairie Grove, IL (US); Karl F. Reichenberger, Mequon, WI (US); Sudhi Sinha, Milwaukee, WI (US); Joseph R. Ribbich, Waukesha, WI (US); Michael L. Ribbich, Oconomowoc, WI (US); Charles J. Gaidish, South Milwaukee, WI (US); John P. Cipolla, Inverness, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/030,422

(22) Filed: Jul. 9, 2018

(65) Prior Publication Data
US 2018/0330586 A1 Nov. 15, 2018

Related U.S. Application Data

(63) Continuation-in-part of application No. 15/336,789, filed on Oct. 28, 2016, now Pat. No. 10,345,781,
(Continued)

(51) Int. Cl.
*G08C 19/22* (2006.01)
*H04Q 9/00* (2006.01)
(Continued)

(52) U.S. Cl.
CPC .......... *G08B 7/066* (2013.01); *G01C 21/206* (2013.01); *G08B 17/08* (2013.01); *G08B 25/016* (2013.01)

(58) Field of Classification Search
CPC ...... G08B 21/10; G08B 7/062; G08B 25/005; G08B 21/0453; H05B 37/0218;
(Continued)

(56) References Cited

U.S. PATENT DOCUMENTS

| 4,107,464 A | 8/1978 | Lynch et al. |
| 4,873,649 A | 10/1989 | Grald et al. |

(Continued)

FOREIGN PATENT DOCUMENTS

| CA | 2466854 | 4/2008 |
| CA | 2633200 | 1/2011 |

(Continued)

OTHER PUBLICATIONS

Cuevas et al., Integrating Gesture-Based Identification in Context-Aware Applications: A System Approach, 2014, 8 pages.
(Continued)

*Primary Examiner* — Tanmay K Shah
(74) *Attorney, Agent, or Firm* — Foley & Lardner LLP

(57) ABSTRACT

A first thermostat of a building includes a communications interface configured to communicate with at least one of a second thermostat or a network server, a user interface configured to display information to a user and receive input from the user, and a processing circuit. The processing circuit is configured to generate building navigation direction data for user navigation through the building, cause the user interface to display a first building navigation direction based on the generated building navigation direction data, and cause, via the communications interface, the second thermostat to display a second building navigation direction on a second display of the second thermostat based on the generated building navigation direction data.

25 Claims, 14 Drawing Sheets

Related U.S. Application Data which is a continuation-in-part of application No. 15/338,215, filed on Oct. 28, 2016, now Pat. No. 10,020,956, and a continuation-in-part of application No. 15/336,792, filed on Oct. 28, 2016, now Pat. No. 10,180,673, which is a continuation-in-part of application No. 15/338,221, filed on Oct. 28, 2016, now Pat. No. 10,187,471, and a continuation-in-part of application No. 15/397,722, filed on Jan. 3, 2017, which is a continuation-in-part of application No. 15/336,791, filed on Oct. 28, 2016, now Pat. No. 10,162,327.

(60) Provisional application No. 62/247,672, filed on Oct. 28, 2015, provisional application No. 62/274,750, filed on Jan. 4, 2016, provisional application No. 62/275,199, filed on Jan. 5, 2016, provisional application No. 62/275,202, filed on Jan. 5, 2016, provisional application No. 62/275,204, filed on Jan. 5, 2016, provisional application No. 62/275,711, filed on Jan. 6, 2016.

(51) Int. Cl.
  *G08B 7/06* (2006.01)
  *G01C 21/20* (2006.01)
  *G08B 25/01* (2006.01)
  *G08B 17/08* (2006.01)

(58) Field of Classification Search
  CPC ... H04W 64/003; G06Q 20/10; G06Q 20/405; G06Q 50/12; G06Q 50/30; F24F 11/006; F24F 11/0012; F24F 2011/0057; F24F 2011/0035; F24F 2011/0061; F24F 2011/0036; F24F 2011/0091; F24F 11/0086; F24F 11/0034; H04L 67/12; A61B 5/02055; A61B 5/681; A61B 5/02405; A61B 5/02438; G07G 5/00; G06F 3/167; G06F 3/04883; G06F 17/30528; A61M 2209/088; A61M 5/1723; G05B 2219/15117; G05B 2219/2642; G05B 2219/2614; G05B 19/048
  USPC .................................................. 340/870.07
  See application file for complete search history.

(56) References Cited

U.S. PATENT DOCUMENTS

| | | |
|---|---|---|
| 4,942,613 A | 7/1990 | Lynch |
| 5,052,186 A | 10/1991 | Dudley et al. |
| 5,062,276 A | 11/1991 | Dudley |
| 5,797,729 A | 8/1998 | Rafuse et al. |
| 6,121,885 A | 9/2000 | Masone et al. |
| 6,164,374 A | 12/2000 | Rhodes et al. |
| 6,169,937 B1 | 1/2001 | Peterson |
| 6,227,961 B1 | 5/2001 | Moore et al. |
| 6,260,765 B1 | 7/2001 | Natale et al. |
| 6,314,750 B1 | 11/2001 | Ishikawa et al. |
| 6,351,693 B1 | 2/2002 | Monie et al. |
| 6,435,418 B1 | 8/2002 | Toth et al. |
| 6,478,233 B1 | 11/2002 | Shah |
| 6,487,869 B1 | 12/2002 | Sulc et al. |
| 6,557,771 B2 | 5/2003 | Shah |
| 6,641,054 B2 | 11/2003 | Morey |
| 6,726,112 B1 | 4/2004 | Ho |
| 6,726,113 B2 | 4/2004 | Guo |
| 6,810,307 B1 | 10/2004 | Addy |
| 6,824,069 B2 | 11/2004 | Rosen |
| 6,851,621 B1 | 2/2005 | Wacker et al. |
| 6,874,691 B1 | 4/2005 | Hildebrand et al. |
| 6,888,441 B2 | 5/2005 | Carey |
| 6,912,429 B1 | 6/2005 | Bilger |
| 6,995,518 B2 | 2/2006 | Havlik et al. |
| 7,028,912 B1 | 4/2006 | Rosen |
| 7,083,109 B2 | 8/2006 | Pouchak |
| 7,099,748 B2 | 8/2006 | Rayburn |
| 7,140,551 B2 | 11/2006 | De Pauw et al. |
| 7,146,253 B2 | 12/2006 | Hoog et al. |
| 7,152,806 B1 | 12/2006 | Rosen |
| 7,156,317 B1 | 1/2007 | Moore |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,167,079 B2 | 1/2007 | Smyth et al. |
| 7,188,002 B2 | 3/2007 | Chapman et al. |
| 7,212,887 B2 | 5/2007 | Shah et al. |
| 7,225,054 B2 | 5/2007 | Amundson et al. |
| 7,232,075 B1 | 6/2007 | Rosen |
| 7,261,243 B2 | 8/2007 | Butler et al. |
| 7,274,972 B2 | 9/2007 | Amundson et al. |
| 7,287,709 B2 | 10/2007 | Proffitt et al. |
| 7,296,426 B2 | 11/2007 | Butler et al. |
| 7,299,996 B2 | 11/2007 | Garrett et al. |
| 7,306,165 B2 | 12/2007 | Shah |
| 7,308,384 B2 | 12/2007 | Shah et al. |
| 7,317,970 B2 | 1/2008 | Pienta et al. |
| 7,331,187 B2 | 2/2008 | Kates |
| 7,343,751 B2 | 3/2008 | Kates |
| 7,383,158 B2 | 6/2008 | Krocker et al. |
| RE40,437 E | 7/2008 | Rosen |
| 7,402,780 B2 | 7/2008 | Mueller et al. |
| 7,434,744 B2 | 10/2008 | Garozzo et al. |
| 7,442,012 B2 | 10/2008 | Moens |
| 7,469,550 B2 | 12/2008 | Chapman et al. |
| 7,475,558 B2 | 1/2009 | Perry |
| 7,475,828 B2 | 1/2009 | Bartlett et al. |
| 7,556,207 B2 | 7/2009 | Mueller et al. |
| 7,565,813 B2 | 7/2009 | Pouchak |
| 7,575,179 B2 | 8/2009 | Morrow et al. |
| 7,584,897 B2 | 9/2009 | Schultz et al. |
| 7,614,567 B2 | 11/2009 | Chapman et al. |
| 7,624,931 B2 | 12/2009 | Chapman et al. |
| 7,633,743 B2 | 12/2009 | Barton et al. |
| 7,636,604 B2 | 12/2009 | Bergman et al. |
| 7,638,739 B2 | 12/2009 | Rhodes et al. |
| 7,641,126 B2 | 1/2010 | Schultz et al. |
| 7,645,158 B2 | 1/2010 | Mulhouse et al. |
| 7,667,163 B2 | 2/2010 | Ashworth et al. |
| 7,726,581 B2 | 6/2010 | Naujok et al. |
| 7,731,096 B2 | 6/2010 | Lorenz et al. |
| 7,731,098 B2 | 6/2010 | Butler et al. |
| 7,740,184 B2 | 6/2010 | Schnell et al. |
| 7,748,225 B2 | 7/2010 | Butler et al. |
| 7,748,639 B2 | 7/2010 | Perry |
| 7,748,640 B2 | 7/2010 | Roher et al. |
| 7,755,220 B2 | 7/2010 | Sorg et al. |
| 7,765,826 B2 | 8/2010 | Nichols |
| 7,774,102 B2 | 8/2010 | Butler et al. |
| 7,775,452 B2 | 8/2010 | Shah et al. |
| 7,784,291 B2 | 8/2010 | Butler et al. |
| 7,784,704 B2 | 8/2010 | Harter |
| 7,802,618 B2 | 9/2010 | Simon et al. |
| 7,832,221 B2 | 11/2010 | Wijaya et al. |
| 7,832,652 B2 | 11/2010 | Barton et al. |
| 7,845,576 B2 | 12/2010 | Siddaramanna et al. |
| 7,861,941 B2 | 1/2011 | Schultz et al. |
| 7,867,646 B2 | 1/2011 | Rhodes |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,918,406 B2 | 4/2011 | Rosen |
| 7,938,336 B2 | 5/2011 | Rhodes et al. |
| 7,941,294 B2 | 5/2011 | Shahi et al. |
| 7,954,726 B2 | 6/2011 | Siddaramanna et al. |
| 7,963,454 B2 | 6/2011 | Sullivan et al. |
| 7,979,164 B2 | 7/2011 | Garozzo et al. |
| 7,992,794 B2 | 8/2011 | Leen et al. |
| 8,010,237 B2 | 8/2011 | Cheung et al. |

(56) References Cited

U.S. PATENT DOCUMENTS

| | | |
|---|---|---|
| 8,032,254 B2 | 10/2011 | Amundson et al. |
| 8,078,326 B2 | 12/2011 | Harrod et al. |
| 8,082,065 B2 | 12/2011 | Imes et al. |
| 8,083,154 B2 | 12/2011 | Schultz et al. |
| 8,089,032 B2 | 1/2012 | Beland et al. |
| 8,091,794 B2 | 1/2012 | Siddaramanna et al. |
| 8,099,195 B2 | 1/2012 | Imes et al. |
| 8,108,076 B2 | 1/2012 | Imes et al. |
| 8,131,506 B2 | 3/2012 | Steinberg et al. |
| 8,141,791 B2 | 3/2012 | Rosen |
| 8,167,216 B2 | 5/2012 | Schultz et al. |
| 8,180,492 B2 | 5/2012 | Steinberg |
| 8,190,296 B2 | 5/2012 | Alhilo |
| 8,195,313 B1 | 6/2012 | Fadell et al. |
| 8,196,185 B2 | 6/2012 | Geadelmann et al. |
| 8,209,059 B2 | 6/2012 | Stockton |
| 8,239,066 B2 | 8/2012 | Jennings et al. |
| 8,276,829 B2 | 10/2012 | Stoner et al. |
| 8,280,536 B1 | 10/2012 | Fadell et al. |
| 8,280,556 B2 | 10/2012 | Besore et al. |
| 8,289,182 B2 | 10/2012 | Vogel et al. |
| 8,289,226 B2 | 10/2012 | Takach et al. |
| 8,299,919 B2 | 10/2012 | Dayton et al. |
| 8,321,058 B2 | 11/2012 | Zhou et al. |
| 8,346,396 B2 | 1/2013 | Amundson et al. |
| 8,387,891 B1 | 3/2013 | Simon et al. |
| 8,393,550 B2 | 3/2013 | Simon et al. |
| 8,412,382 B2 | 4/2013 | Imes et al. |
| 8,412,488 B2 | 4/2013 | Steinberg et al. |
| 8,429,566 B2 | 4/2013 | Koushik et al. |
| 8,456,293 B1 | 6/2013 | Trundle et al. |
| 8,473,109 B1 | 6/2013 | Imes et al. |
| 8,476,964 B1 | 7/2013 | Atri |
| 8,489,243 B2 | 7/2013 | Fadell et al. |
| 8,498,749 B2 | 7/2013 | Imes et al. |
| 8,504,180 B2 | 8/2013 | Imes et al. |
| 8,510,255 B2 | 8/2013 | Fadell et al. |
| 8,511,576 B2 | 8/2013 | Warren et al. |
| 8,511,577 B2 | 8/2013 | Warren et al. |
| 8,517,088 B2 | 8/2013 | Moore et al. |
| 8,523,083 B2 | 9/2013 | Warren et al. |
| 8,523,084 B2 | 9/2013 | Siddaramanna et al. |
| 8,527,096 B2 | 9/2013 | Pavlak et al. |
| 8,532,827 B2 | 9/2013 | Stefanski et al. |
| 8,538,588 B2 | 9/2013 | Kasper |
| 8,544,285 B2 | 10/2013 | Stefanski et al. |
| 8,549,658 B2 | 10/2013 | Kolavennu et al. |
| 8,550,368 B2 | 10/2013 | Butler et al. |
| 8,554,374 B2 | 10/2013 | Lunacek et al. |
| 8,555,662 B2 | 10/2013 | Peterson et al. |
| 8,558,179 B2 | 10/2013 | Filson et al. |
| 8,560,127 B2 | 10/2013 | Leen et al. |
| 8,560,128 B2 | 10/2013 | Ruff et al. |
| 8,571,518 B2 | 10/2013 | Imes et al. |
| 8,596,550 B2 | 12/2013 | Steinberg et al. |
| 8,600,564 B2 | 12/2013 | Imes et al. |
| 8,606,409 B2 | 12/2013 | Amundson et al. |
| 8,613,792 B2 | 12/2013 | Ragland et al. |
| 8,620,841 B1 | 12/2013 | Filson et al. |
| 8,622,314 B2 | 1/2014 | Fisher et al. |
| 8,626,344 B2 | 1/2014 | Imes et al. |
| 8,630,741 B1 | 1/2014 | Matsuoka et al. |
| 8,630,742 B1 | 1/2014 | Stefanski et al. |
| 8,644,009 B2 | 2/2014 | Rylski et al. |
| 8,659,302 B1 | 2/2014 | Warren et al. |
| 8,671,702 B1 | 3/2014 | Shotey et al. |
| 8,674,816 B2 | 3/2014 | Trundle et al. |
| 8,689,572 B2 | 4/2014 | Evans et al. |
| 8,695,887 B2 | 4/2014 | Helt et al. |
| 8,706,270 B2 | 4/2014 | Fadell et al. |
| 8,708,242 B2 | 4/2014 | Conner et al. |
| 8,712,590 B2 | 4/2014 | Steinberg |
| 8,718,826 B2 | 5/2014 | Ramachandran et al. |
| 8,726,680 B2 | 5/2014 | Schenk et al. |
| 8,727,611 B2 | 5/2014 | Huppi et al. |
| 8,738,327 B2 | 5/2014 | Steinberg et al. |
| 8,746,583 B2 | 6/2014 | Simon et al. |
| 8,752,771 B2 | 6/2014 | Warren et al. |
| 8,754,780 B2 | 6/2014 | Petite et al. |
| 8,766,194 B2 | 7/2014 | Filson et al. |
| 8,770,490 B2 | 7/2014 | Drew |
| 8,770,491 B2 | 7/2014 | Warren et al. |
| 8,788,100 B2 | 7/2014 | Grohman et al. |
| 8,788,103 B2 | 7/2014 | Warren et al. |
| 8,802,981 B2 | 8/2014 | Wallaert et al. |
| 8,830,267 B2 | 9/2014 | Brackney |
| 8,838,282 B1 | 9/2014 | Ratliff et al. |
| 8,843,239 B2 | 9/2014 | Mighdoll et al. |
| 8,850,348 B2 | 9/2014 | Fadell et al. |
| 8,855,830 B2 | 10/2014 | Imes et al. |
| 8,868,219 B2 | 10/2014 | Fadell et al. |
| 8,870,086 B2 | 10/2014 | Tessier et al. |
| 8,870,087 B2 | 10/2014 | Pienta et al. |
| 8,880,047 B2 | 11/2014 | Konicek et al. |
| 8,893,032 B2 | 11/2014 | Bruck et al. |
| 8,903,552 B2 | 12/2014 | Amundson et al. |
| 8,918,219 B2 | 12/2014 | Sloo et al. |
| 8,942,853 B2 | 1/2015 | Stefanski et al. |
| 8,944,338 B2 | 2/2015 | Warren et al. |
| 8,950,686 B2 | 2/2015 | Matsuoka et al. |
| 8,950,687 B2 | 2/2015 | Bergman et al. |
| 8,961,005 B2 | 2/2015 | Huppi et al. |
| 8,978,994 B2 | 3/2015 | Moore et al. |
| 8,998,102 B2 | 4/2015 | Fadell et al. |
| 9,014,686 B2 | 4/2015 | Ramachandran et al. |
| 9,014,860 B2 | 4/2015 | Moore et al. |
| 9,020,647 B2 | 4/2015 | Johnson et al. |
| 9,026,232 B2 | 5/2015 | Fadell et al. |
| 9,033,255 B2 | 5/2015 | Tessier et al. |
| RE45,574 E | 6/2015 | Harter |
| 9,074,784 B2 | 7/2015 | Sullivan et al. |
| 9,075,419 B2 | 7/2015 | Sloo et al. |
| 9,077,055 B2 | 7/2015 | Yau |
| 9,080,782 B1 | 7/2015 | Sheikh |
| 9,081,393 B2 | 7/2015 | Lunacek et al. |
| 9,086,703 B2 | 7/2015 | Warren et al. |
| 9,088,306 B1 | 7/2015 | Ramachandran et al. |
| 9,092,039 B2 | 7/2015 | Fadell et al. |
| 9,098,279 B2 | 8/2015 | Mucignat et al. |
| 9,116,529 B2 | 8/2015 | Warren et al. |
| 9,121,623 B2 | 9/2015 | Filson et al. |
| 9,122,283 B2 | 9/2015 | Rylski et al. |
| 9,125,049 B2 | 9/2015 | Huang et al. |
| 9,127,853 B2 | 9/2015 | Filson et al. |
| 9,134,710 B2 | 9/2015 | Cheung et al. |
| 9,134,715 B2 | 9/2015 | Geadelmann et al. |
| 9,146,041 B2 | 9/2015 | Novotny et al. |
| 9,151,510 B2 | 10/2015 | Leen |
| 9,154,001 B2 | 10/2015 | Dharwada et al. |
| 9,157,764 B2 | 10/2015 | Shetty et al. |
| 9,164,524 B2 | 10/2015 | Imes et al. |
| 9,175,868 B2 | 11/2015 | Fadell et al. |
| 9,175,871 B2 | 11/2015 | Gourlay et al. |
| 9,182,141 B2 | 11/2015 | Sullivan et al. |
| 9,189,751 B2 | 11/2015 | Matsuoka et al. |
| 9,191,277 B2 | 11/2015 | Rezvani et al. |
| 9,191,909 B2 | 11/2015 | Rezvani et al. |
| 9,194,597 B2 | 11/2015 | Steinberg et al. |
| 9,194,598 B2 | 11/2015 | Fadell et al. |
| 9,194,600 B2 | 11/2015 | Kates |
| 9,207,817 B2 | 12/2015 | Tu |
| 9,213,342 B2 | 12/2015 | Drake et al. |
| 9,215,281 B2 | 12/2015 | Iggulden et al. |
| 9,222,693 B2 | 12/2015 | Gourlay et al. |
| 9,223,323 B2 | 12/2015 | Matas et al. |
| 9,234,669 B2 | 1/2016 | Filson et al. |
| 9,244,445 B2 | 1/2016 | Finch et al. |
| 9,244,470 B2 | 1/2016 | Steinberg |
| 9,261,287 B2 | 2/2016 | Warren et al. |
| 9,268,344 B2 | 2/2016 | Warren et al. |
| 9,279,595 B2 | 3/2016 | Mighdoll et al. |
| 9,282,590 B2 | 3/2016 | Donlan |
| 9,285,134 B2 | 3/2016 | Bray et al. |
| 9,285,802 B2 | 3/2016 | Arensmeier |

(56) References Cited

U.S. PATENT DOCUMENTS

| | | |
|---|---|---|
| 9,286,781 B2 | 3/2016 | Filson et al. |
| 9,291,359 B2 | 3/2016 | Fadell et al. |
| 9,292,022 B2 | 3/2016 | Ramachandran et al. |
| 9,298,196 B2 | 3/2016 | Matsuoka et al. |
| 9,298,197 B2 | 3/2016 | Matsuoka et al. |
| 9,353,965 B1 | 5/2016 | Goyal et al. |
| D763,707 S | 8/2016 | Sinha et al. |
| D790,369 S | 6/2017 | Sinha et al. |
| 9,696,701 B2 | 7/2017 | Vasylyev |
| D810,591 S | 2/2018 | Ribbich et al. |
| 9,887,887 B2 | 2/2018 | Hunter et al. |
| D814,321 S | 4/2018 | Abdala et al. |
| 2001/0015281 A1 | 8/2001 | Schiedegger et al. |
| 2002/0123843 A1 | 9/2002 | Hood |
| 2003/0034897 A1 | 2/2003 | Shamoon et al. |
| 2003/0034898 A1 | 2/2003 | Shamoon et al. |
| 2003/0136853 A1 | 7/2003 | Morey |
| 2003/0177012 A1 | 9/2003 | Drennan |
| 2004/0074978 A1 | 4/2004 | Rosen |
| 2004/0125940 A1 | 7/2004 | Turcan et al. |
| 2004/0249479 A1 | 12/2004 | Shorrock |
| 2004/0262410 A1 | 12/2004 | Hull |
| 2005/0040943 A1 | 2/2005 | Winick |
| 2005/0083168 A1 | 4/2005 | Breitenbach |
| 2005/0119794 A1 | 6/2005 | Amundson et al. |
| 2005/0156049 A1 | 7/2005 | Van Ostrand et al. |
| 2005/0194456 A1 | 9/2005 | Tessier et al. |
| 2005/0195757 A1 | 9/2005 | Kidder et al. |
| 2005/0270151 A1 | 12/2005 | Winick |
| 2005/0270735 A1 | 12/2005 | Chen |
| 2006/0038025 A1 | 2/2006 | Lee |
| 2006/0113398 A1 | 6/2006 | Ashworth |
| 2006/0192022 A1 | 8/2006 | Barton et al. |
| 2006/0226970 A1 | 10/2006 | Saga et al. |
| 2006/0260334 A1 | 11/2006 | Carey et al. |
| 2006/0265489 A1 | 11/2006 | Moore |
| 2007/0013532 A1 | 1/2007 | Ehlers |
| 2007/0045431 A1 | 3/2007 | Chapman et al. |
| 2007/0050732 A1 | 3/2007 | Chapman et al. |
| 2007/0057079 A1 | 3/2007 | Stark et al. |
| 2007/0114295 A1 | 5/2007 | Jenkins |
| 2007/0198099 A9 | 8/2007 | Shah |
| 2007/0228182 A1 | 10/2007 | Wagner et al. |
| 2007/0228183 A1 | 10/2007 | Kennedy et al. |
| 2007/0241203 A1 | 10/2007 | Wagner et al. |
| 2008/0015740 A1 | 1/2008 | Osann |
| 2008/0048046 A1 | 2/2008 | Wagner et al. |
| 2008/0054084 A1 | 3/2008 | Olson |
| 2008/0099568 A1 | 5/2008 | Nicodem et al. |
| 2008/0120446 A1 | 5/2008 | Butler et al. |
| 2008/0161978 A1 | 7/2008 | Shah |
| 2008/0216495 A1 | 9/2008 | Kates |
| 2008/0221714 A1 | 9/2008 | Schoettle |
| 2008/0223051 A1 | 9/2008 | Kates |
| 2008/0227430 A1 | 9/2008 | Polk |
| 2008/0280637 A1 | 11/2008 | Shaffer et al. |
| 2008/0289347 A1 | 11/2008 | Kadle et al. |
| 2008/0290183 A1 | 11/2008 | Laberge et al. |
| 2008/0294274 A1 | 11/2008 | Laberge et al. |
| 2008/0295030 A1 | 11/2008 | Laberge et al. |
| 2009/0122329 A1 | 5/2009 | Hegemier et al. |
| 2009/0140065 A1 | 6/2009 | Juntunen et al. |
| 2009/0143880 A1 | 6/2009 | Amundson et al. |
| 2009/0143918 A1 | 6/2009 | Amundson et al. |
| 2009/0144015 A1 | 6/2009 | Bedard |
| 2009/0251422 A1 | 10/2009 | Wu et al. |
| 2009/0276096 A1 | 11/2009 | Proffitt et al. |
| 2010/0070092 A1 | 3/2010 | Winter et al. |
| 2010/0084482 A1 | 4/2010 | Kennedy et al. |
| 2010/0106334 A1 | 4/2010 | Grohman et al. |
| 2010/0131884 A1 | 5/2010 | Shah |
| 2010/0145536 A1 | 6/2010 | Masters et al. |
| 2010/0163633 A1 | 7/2010 | Barrett et al. |
| 2010/0163635 A1 | 7/2010 | Ye |
| 2010/0171889 A1 | 7/2010 | Pantel et al. |
| 2010/0182743 A1 | 7/2010 | Roher |
| 2010/0190479 A1 | 7/2010 | Scott et al. |
| 2010/0204834 A1 | 8/2010 | Comerford et al. |
| 2010/0212879 A1 | 8/2010 | Schnell et al. |
| 2010/0250707 A1 | 9/2010 | Dalley et al. |
| 2011/0006887 A1 | 1/2011 | Shaull et al. |
| 2011/0046798 A1 | 2/2011 | Imes et al. |
| 2011/0067851 A1 | 3/2011 | Terlson et al. |
| 2011/0087988 A1 | 4/2011 | Ray et al. |
| 2011/0088416 A1 | 4/2011 | Koethler |
| 2011/0132991 A1 | 6/2011 | Moody et al. |
| 2011/0181412 A1 | 7/2011 | Alexander et al. |
| 2011/0209097 A1 | 8/2011 | Hinckley et al. |
| 2011/0264279 A1 | 10/2011 | Poth |
| 2012/0001873 A1 | 1/2012 | Wu et al. |
| 2012/0007555 A1 | 1/2012 | Bukow |
| 2012/0046859 A1 | 2/2012 | Imes et al. |
| 2012/0048955 A1 | 3/2012 | Lin et al. |
| 2012/0061480 A1 | 3/2012 | Deligiannis et al. |
| 2012/0093141 A1 | 4/2012 | Imes et al. |
| 2012/0095601 A1 | 4/2012 | Abraham et al. |
| 2012/0101637 A1 | 4/2012 | Imes et al. |
| 2012/0123594 A1 | 5/2012 | Finch et al. |
| 2012/0126020 A1 | 5/2012 | Filson et al. |
| 2012/0126021 A1 | 5/2012 | Warren et al. |
| 2012/0131504 A1 | 5/2012 | Fadell et al. |
| 2012/0165993 A1 | 6/2012 | Whitehouse |
| 2012/0179727 A1 | 7/2012 | Esser |
| 2012/0181010 A1 | 7/2012 | Schultz et al. |
| 2012/0191257 A1 | 7/2012 | Corcoran et al. |
| 2012/0193437 A1 | 8/2012 | Henry et al. |
| 2012/0229521 A1 | 9/2012 | Hales et al. |
| 2012/0230661 A1 | 9/2012 | Alhilo |
| 2012/0239207 A1 | 9/2012 | Fadell et al. |
| 2012/0252430 A1 | 10/2012 | Imes et al. |
| 2012/0259469 A1 | 10/2012 | Ward et al. |
| 2012/0259470 A1 | 10/2012 | Nijhawan et al. |
| 2012/0298763 A1 | 11/2012 | Young |
| 2012/0303165 A1 | 11/2012 | Qu et al. |
| 2012/0303828 A1 | 11/2012 | Young et al. |
| 2012/0310418 A1 | 12/2012 | Harrod et al. |
| 2012/0315848 A1 | 12/2012 | Smith et al. |
| 2013/0002447 A1 | 1/2013 | Vogel et al. |
| 2013/0054758 A1 | 2/2013 | Imes et al. |
| 2013/0057381 A1 | 3/2013 | Kandhasamy |
| 2013/0087628 A1 | 4/2013 | Nelson et al. |
| 2013/0090767 A1 | 4/2013 | Bruck et al. |
| 2013/0099008 A1 | 4/2013 | Aljabari et al. |
| 2013/0099009 A1 | 4/2013 | Filson et al. |
| 2013/0123991 A1 | 5/2013 | Richmond |
| 2013/0138250 A1 | 5/2013 | Mowery et al. |
| 2013/0144443 A1 | 6/2013 | Casson et al. |
| 2013/0151016 A1 | 6/2013 | Bias et al. |
| 2013/0151018 A1 | 6/2013 | Bias et al. |
| 2013/0158721 A1 | 6/2013 | Somasundaram et al. |
| 2013/0163300 A1 | 6/2013 | Zhao et al. |
| 2013/0180700 A1 | 7/2013 | Aycock |
| 2013/0190932 A1 | 7/2013 | Schuman |
| 2013/0190940 A1 | 7/2013 | Sloop et al. |
| 2013/0204408 A1 | 8/2013 | Thiruvengada et al. |
| 2013/0204441 A1 | 8/2013 | Sloo et al. |
| 2013/0204442 A1 | 8/2013 | Modi et al. |
| 2013/0211600 A1 | 8/2013 | Dean-Hendricks et al. |
| 2013/0215058 A1 | 8/2013 | Brazell et al. |
| 2013/0221117 A1 | 8/2013 | Warren et al. |
| 2013/0228633 A1 | 9/2013 | Toth et al. |
| 2013/0234840 A1 | 9/2013 | Trundle et al. |
| 2013/0238142 A1 | 9/2013 | Nichols et al. |
| 2013/0245838 A1 | 9/2013 | Zywicki et al. |
| 2013/0261803 A1 | 10/2013 | Kolavennu |
| 2013/0261807 A1 | 10/2013 | Zywicki et al. |
| 2013/0268125 A1 | 10/2013 | Matsuoka |
| 2013/0268129 A1 | 10/2013 | Fadell et al. |
| 2013/0271670 A1 | 10/2013 | Sakata et al. |
| 2013/0292481 A1 | 11/2013 | Filson et al. |
| 2013/0297078 A1 | 11/2013 | Kolavennu |
| 2013/0310418 A1 | 11/2013 | Brenchley et al. |
| 2013/0318217 A1 | 11/2013 | Imes et al. |
| 2013/0318444 A1 | 11/2013 | Imes et al. |

(56) References Cited

U.S. PATENT DOCUMENTS

| | | |
|---|---|---|
| 2013/0325190 A1 | 12/2013 | Imes et al. |
| 2013/0332000 A1 | 12/2013 | Imes et al. |
| 2013/0338837 A1 | 12/2013 | Hublou et al. |
| 2013/0338839 A1 | 12/2013 | Rogers et al. |
| 2013/0340993 A1 | 12/2013 | Siddaramanna et al. |
| 2013/0345882 A1 | 12/2013 | Dushane et al. |
| 2014/0000861 A1 | 1/2014 | Barrett et al. |
| 2014/0002461 A1 | 1/2014 | Wang |
| 2014/0031989 A1 | 1/2014 | Bergman et al. |
| 2014/0034284 A1 | 2/2014 | Butler et al. |
| 2014/0039692 A1 | 2/2014 | Leen et al. |
| 2014/0041846 A1 | 2/2014 | Leen et al. |
| 2014/0048608 A1 | 2/2014 | Frank |
| 2014/0052300 A1 | 2/2014 | Matsuoka et al. |
| 2014/0058806 A1 | 2/2014 | Guenette et al. |
| 2014/0070919 A1 | 3/2014 | Jackson et al. |
| 2014/0081466 A1 | 3/2014 | Huapeng et al. |
| 2014/0112331 A1 | 4/2014 | Rosen |
| 2014/0114706 A1 | 4/2014 | Blakely |
| 2014/0117103 A1 | 5/2014 | Rossi et al. |
| 2014/0118285 A1 | 5/2014 | Poplawski |
| 2014/0129034 A1 | 5/2014 | Stefanski et al. |
| 2014/0149270 A1 | 5/2014 | Lombard et al. |
| 2014/0151456 A1 | 6/2014 | Mccurnin et al. |
| 2014/0152631 A1 | 6/2014 | Moore et al. |
| 2014/0156087 A1 | 6/2014 | Amundson |
| 2014/0158338 A1 | 6/2014 | Kates |
| 2014/0165612 A1 | 6/2014 | Qu et al. |
| 2014/0175181 A1 | 6/2014 | Warren et al. |
| 2014/0188288 A1 | 7/2014 | Fisher et al. |
| 2014/0191848 A1 | 7/2014 | Imes et al. |
| 2014/0207291 A1 | 7/2014 | Golden et al. |
| 2014/0207292 A1 | 7/2014 | Ramagem et al. |
| 2014/0214212 A1 | 7/2014 | Leen et al. |
| 2014/0216078 A1 | 8/2014 | Ladd |
| 2014/0217185 A1 | 8/2014 | Bicknell |
| 2014/0217186 A1 | 8/2014 | Kramer et al. |
| 2014/0228983 A1 | 8/2014 | Groskreutz et al. |
| 2014/0231530 A1 | 8/2014 | Warren et al. |
| 2014/0244047 A1 | 8/2014 | Oh et al. |
| 2014/0250397 A1 | 9/2014 | Kannan et al. |
| 2014/0250399 A1 | 9/2014 | Gaherwar |
| 2014/0262196 A1 | 9/2014 | Frank et al. |
| 2014/0262484 A1 | 9/2014 | Khoury et al. |
| 2014/0263679 A1 | 9/2014 | Conner et al. |
| 2014/0266669 A1* | 9/2014 | Fadell .................. G05B 19/042 340/501 |
| 2014/0267008 A1 | 9/2014 | Jain et al. |
| 2014/0277762 A1 | 9/2014 | Drew |
| 2014/0277769 A1 | 9/2014 | Matsuoka et al. |
| 2014/0277770 A1 | 9/2014 | Aljabari et al. |
| 2014/0299670 A1 | 10/2014 | Ramachandran et al. |
| 2014/0309792 A1 | 10/2014 | Drew |
| 2014/0312129 A1 | 10/2014 | Zikes et al. |
| 2014/0312131 A1 | 10/2014 | Tousignant et al. |
| 2014/0312694 A1 | 10/2014 | Tu et al. |
| 2014/0316585 A1 | 10/2014 | Boesveld et al. |
| 2014/0316586 A1 | 10/2014 | Boesveld et al. |
| 2014/0316587 A1 | 10/2014 | Imes et al. |
| 2014/0317029 A1 | 10/2014 | Matsuoka et al. |
| 2014/0319231 A1 | 10/2014 | Matsuoka et al. |
| 2014/0319236 A1 | 10/2014 | Novotny et al. |
| 2014/0320282 A1 | 10/2014 | Zhang |
| 2014/0321011 A1 | 10/2014 | Bisson et al. |
| 2014/0324232 A1 | 10/2014 | Modi et al. |
| 2014/0330435 A1 | 11/2014 | Stoner et al. |
| 2014/0346239 A1 | 11/2014 | Fadell et al. |
| 2014/0358295 A1 | 12/2014 | Warren et al. |
| 2014/0367475 A1 | 12/2014 | Fadell et al. |
| 2014/0376530 A1 | 12/2014 | Erickson et al. |
| 2014/0376747 A1 | 12/2014 | Mullet et al. |
| 2015/0001361 A1 | 1/2015 | Gagne et al. |
| 2015/0002165 A1 | 1/2015 | Juntunen et al. |
| 2015/0016443 A1 | 1/2015 | Erickson et al. |
| 2015/0025693 A1 | 1/2015 | Wu et al. |
| 2015/0039137 A1 | 2/2015 | Perry et al. |
| 2015/0041551 A1 | 2/2015 | Tessier et al. |
| 2015/0043615 A1 | 2/2015 | Steinberg et al. |
| 2015/0045976 A1 | 2/2015 | Li |
| 2015/0046162 A1 | 2/2015 | Aley-Raz et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0058779 A1 | 2/2015 | Bruck et al. |
| 2015/0061859 A1 | 3/2015 | Matsuoka et al. |
| 2015/0066215 A1 | 3/2015 | Buduri |
| 2015/0066216 A1 | 3/2015 | Ramachandran |
| 2015/0066220 A1 | 3/2015 | Sloo et al. |
| 2015/0081106 A1 | 3/2015 | Buduri |
| 2015/0081109 A1 | 3/2015 | Fadell et al. |
| 2015/0081568 A1 | 3/2015 | Land |
| 2015/0082225 A1 | 3/2015 | Shearer |
| 2015/0088272 A1 | 3/2015 | Drew |
| 2015/0088318 A1 | 3/2015 | Amundson et al. |
| 2015/0100166 A1 | 4/2015 | Baynes et al. |
| 2015/0100167 A1 | 4/2015 | Sloo et al. |
| 2015/0115045 A1 | 4/2015 | Tu et al. |
| 2015/0115046 A1 | 4/2015 | Warren et al. |
| 2015/0124853 A1 | 5/2015 | Huppi et al. |
| 2015/0127176 A1 | 5/2015 | Bergman et al. |
| 2015/0140994 A1 | 5/2015 | Partheesh et al. |
| 2015/0142180 A1 | 5/2015 | Matsuoka et al. |
| 2015/0144706 A1 | 5/2015 | Robideau et al. |
| 2015/0145653 A1 | 5/2015 | Katingari et al. |
| 2015/0148963 A1 | 5/2015 | Klein et al. |
| 2015/0153057 A1 | 6/2015 | Matsuoka et al. |
| 2015/0153060 A1 | 6/2015 | Stefanski et al. |
| 2015/0156631 A1 | 6/2015 | Ramachandran |
| 2015/0159893 A1 | 6/2015 | Daubman et al. |
| 2015/0159899 A1 | 6/2015 | Bergman et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160691 A1 | 6/2015 | Kadah et al. |
| 2015/0163945 A1 | 6/2015 | Barton et al. |
| 2015/0167995 A1 | 6/2015 | Fadell et al. |
| 2015/0168002 A1 | 6/2015 | Plitkins et al. |
| 2015/0168003 A1 | 6/2015 | Stefanski et al. |
| 2015/0168933 A1 | 6/2015 | Klein et al. |
| 2015/0176854 A1 | 6/2015 | Butler et al. |
| 2015/0176855 A1 | 6/2015 | Geadelmann et al. |
| 2015/0198346 A1 | 7/2015 | Vedpathak |
| 2015/0198347 A1 | 7/2015 | Tessier et al. |
| 2015/0204558 A1 | 7/2015 | Sartain et al. |
| 2015/0204561 A1 | 7/2015 | Sadwick et al. |
| 2015/0204563 A1 | 7/2015 | Imes et al. |
| 2015/0204564 A1 | 7/2015 | Shah |
| 2015/0204565 A1 | 7/2015 | Amundson et al. |
| 2015/0204569 A1 | 7/2015 | Lorenz et al. |
| 2015/0204570 A1 | 7/2015 | Adamik et al. |
| 2015/0205310 A1 | 7/2015 | Amundson et al. |
| 2015/0219357 A1 | 8/2015 | Stefanski et al. |
| 2015/0233594 A1 | 8/2015 | Abe et al. |
| 2015/0233595 A1 | 8/2015 | Fadell et al. |
| 2015/0233596 A1 | 8/2015 | Warren et al. |
| 2015/0234369 A1 | 8/2015 | Wen et al. |
| 2015/0241078 A1 | 8/2015 | Matsuoka et al. |
| 2015/0245189 A1 | 8/2015 | Nalluri et al. |
| 2015/0248118 A1 | 9/2015 | Li et al. |
| 2015/0249605 A1 | 9/2015 | Erickson et al. |
| 2015/0260424 A1 | 9/2015 | Fadell et al. |
| 2015/0267935 A1 | 9/2015 | Devenish et al. |
| 2015/0268652 A1 | 9/2015 | Lunacek et al. |
| 2015/0276237 A1 | 10/2015 | Daniels et al. |
| 2015/0276238 A1 | 10/2015 | Matsuoka et al. |
| 2015/0276239 A1 | 10/2015 | Fadell et al. |
| 2015/0276254 A1 | 10/2015 | Nemcek et al. |
| 2015/0276266 A1 | 10/2015 | Warren et al. |
| 2015/0277463 A1 | 10/2015 | Hazzard et al. |
| 2015/0277492 A1 | 10/2015 | Chau et al. |
| 2015/0280935 A1 | 10/2015 | Poplawski et al. |
| 2015/0287310 A1 | 10/2015 | Deiiuliis et al. |
| 2015/0292764 A1 | 10/2015 | Land et al. |
| 2015/0292765 A1 | 10/2015 | Matsuoka et al. |

(56) References Cited

U.S. PATENT DOCUMENTS

| | | |
|---|---|---|
| 2015/0293541 A1 | 10/2015 | Fadell et al. |
| 2015/0300672 A1 | 10/2015 | Fadell et al. |
| 2015/0312696 A1 | 10/2015 | Ribbich et al. |
| 2015/0316285 A1 | 11/2015 | Clifton et al. |
| 2015/0316286 A1 | 11/2015 | Roher |
| 2015/0316902 A1 | 11/2015 | Wenzel et al. |
| 2015/0323212 A1 | 11/2015 | Warren et al. |
| 2015/0327010 A1 | 11/2015 | Gottschalk et al. |
| 2015/0327084 A1 | 11/2015 | Ramachandran et al. |
| 2015/0327375 A1 | 11/2015 | Bick et al. |
| 2015/0330654 A1 | 11/2015 | Matsuoka |
| 2015/0330658 A1 | 11/2015 | Filson et al. |
| 2015/0330660 A1 | 11/2015 | Filson et al. |
| 2015/0332150 A1 | 11/2015 | Thompson |
| 2015/0338117 A1 | 11/2015 | Henneberger et al. |
| 2015/0345818 A1 | 12/2015 | Oh et al. |
| 2015/0348554 A1 | 12/2015 | Orr et al. |
| 2015/0354844 A1 | 12/2015 | Kates |
| 2015/0354846 A1 | 12/2015 | Hales et al. |
| 2015/0355371 A1 | 12/2015 | Ableitner et al. |
| 2015/0362208 A1 | 12/2015 | Novotny et al. |
| 2015/0362926 A1 | 12/2015 | Yarde et al. |
| 2015/0362927 A1 | 12/2015 | Giorgi |
| 2015/0364135 A1 | 12/2015 | Kolavennu et al. |
| 2015/0370270 A1 | 12/2015 | Pan et al. |
| 2015/0370272 A1 | 12/2015 | Reddy et al. |
| 2015/0370615 A1 | 12/2015 | Pi-Sunyer |
| 2015/0370621 A1 | 12/2015 | Karp et al. |
| 2015/0372832 A1 | 12/2015 | Kortz et al. |
| 2015/0372834 A1 | 12/2015 | Karp et al. |
| 2015/0372999 A1 | 12/2015 | Pi-Sunyer |
| 2016/0006274 A1 | 1/2016 | Tu et al. |
| 2016/0006577 A1 | 1/2016 | Logan |
| 2016/0010880 A1 | 1/2016 | Bravard et al. |
| 2016/0018122 A1 | 1/2016 | Frank et al. |
| 2016/0018127 A1 | 1/2016 | Gourlay et al. |
| 2016/0020590 A1 | 1/2016 | Roosli et al. |
| 2016/0026194 A1 | 1/2016 | Mucignat et al. |
| 2016/0036227 A1 | 2/2016 | Schultz et al. |
| 2016/0040903 A1 | 2/2016 | Emmons et al. |
| 2016/0047569 A1 | 2/2016 | Fadell et al. |
| 2016/0054022 A1 | 2/2016 | Matas et al. |
| 2016/0054792 A1 | 2/2016 | Poupyrev |
| 2016/0054988 A1 | 2/2016 | Desire |
| 2016/0061471 A1 | 3/2016 | Eicher et al. |
| 2016/0061474 A1 | 3/2016 | Cheung et al. |
| 2016/0069582 A1 | 3/2016 | Buduri |
| 2016/0069583 A1 | 3/2016 | Fadell et al. |
| 2016/0077532 A1 | 3/2016 | Lagerstedt et al. |
| 2016/0088041 A1 | 3/2016 | Nichols |
| 2016/0107820 A1 | 4/2016 | Macvittie et al. |
| 2016/0138819 A1 | 5/2016 | Vega |
| 2016/0171289 A1 | 6/2016 | Lee et al. |
| 2016/0180663 A1 | 6/2016 | Mcmahan et al. |
| 2016/0223216 A1 | 8/2016 | Buda et al. |
| 2016/0249437 A1 | 8/2016 | Sun et al. |
| 2016/0327298 A1 | 11/2016 | Sinha et al. |
| 2016/0327299 A1 | 11/2016 | Ribbich et al. |
| 2016/0327300 A1 | 11/2016 | Ribbich et al. |
| 2016/0327301 A1 | 11/2016 | Ribbich et al. |
| 2016/0327302 A1 | 11/2016 | Ribbich et al. |
| 2016/0327921 A1 | 11/2016 | Ribbich et al. |
| 2016/0330084 A1 | 11/2016 | Hunter et al. |
| 2016/0377306 A1 | 12/2016 | Drees et al. |
| 2017/0041454 A1 | 2/2017 | Nicholls et al. |
| 2017/0059197 A1 | 3/2017 | Goyal et al. |
| 2017/0074536 A1 | 3/2017 | Bentz et al. |
| 2017/0074537 A1 | 3/2017 | Bentz et al. |
| 2017/0074539 A1 | 3/2017 | Bentz et al. |
| 2017/0074541 A1 | 3/2017 | Bentz et al. |
| 2017/0075510 A1 | 3/2017 | Bentz et al. |
| 2017/0075568 A1 | 3/2017 | Bentz et al. |
| 2017/0076263 A1 | 3/2017 | Bentz et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0102723 A1 | 4/2017 | Smith et al. |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0122613 A1 | 5/2017 | Sinha et al. |
| 2017/0122617 A1 | 5/2017 | Sinha et al. |
| 2017/0123391 A1 | 5/2017 | Sinha et al. |
| 2017/0124838 A1 | 5/2017 | Sinha et al. |
| 2017/0124842 A1 | 5/2017 | Sinha et al. |
| 2017/0131825 A1 | 5/2017 | Moore et al. |
| 2017/0192402 A1 | 7/2017 | Karp et al. |
| 2017/0263111 A1 | 9/2017 | Deluliis et al. |
| 2017/0292731 A1 | 10/2017 | Matsuoka et al. |
| 2017/0295058 A1 | 10/2017 | Gottschalk et al. |
| 2017/0357607 A1 | 12/2017 | Cayemberg et al. |
| 2018/0023833 A1 | 1/2018 | Matsuoka et al. |
| 2018/0087795 A1 | 3/2018 | Okita et al. |
| 2018/0123821 A1 | 5/2018 | Alberth, Jr. |
| 2018/0124178 A1 | 5/2018 | Alberth, Jr. |

FOREIGN PATENT DOCUMENTS

| | | |
|---|---|---|
| CA | 2633121 | 8/2011 |
| CA | 2818356 | 5/2012 |
| CA | 2818696 | 5/2012 |
| CA | 2853041 | 4/2013 |
| CA | 2853081 | 4/2013 |
| CA | 2812567 | 5/2014 |
| CA | 2886531 | 9/2015 |
| CA | 2894359 | 12/2015 |
| DE | 102004005962 | 8/2005 |
| EP | 2 283 279 | 2/2011 |
| EP | 2 738 478 | 6/2014 |
| EP | 2 897 018 | 7/2015 |
| EP | 2 988 188 | 2/2016 |
| GB | 2 519 441 | 4/2015 |
| WO | WO 00/22491 | 4/2000 |
| WO | WO 2006/041599 | 7/2006 |
| WO | WO 2009/006133 | 1/2009 |
| WO | WO 2009/058127 | 5/2009 |
| WO | WO 2009/036764 | 1/2010 |
| WO | WO 2010/059143 | 5/2010 |
| WO | WO 2010/078459 | 7/2010 |
| WO | WO 2010/088663 | 8/2010 |
| WO | WO 2012/042232 | 4/2012 |
| WO | WO 2012/068436 | 5/2012 |
| WO | WO 2012/068495 | 5/2012 |
| WO | WO 2012/068503 | 5/2012 |
| WO | WO 2012/068507 | 5/2012 |
| WO | WO 2012/068517 | 5/2012 |
| WO | WO 2012/068526 | 5/2012 |
| WO | WO 2013/033469 | 3/2013 |
| WO | WO 2013/052389 | 4/2013 |
| WO | WO 2013/052905 | 4/2013 |
| WO | WO 2013/058933 | 4/2013 |
| WO | WO 2013/058934 | 4/2013 |
| WO | WO 2013/058968 | 4/2013 |
| WO | WO 2013/058969 | 4/2013 |
| WO | WO 2013/059684 | 4/2013 |
| WO | WO 2012/142477 | 8/2013 |
| WO | WO 2013/153480 | 12/2013 |
| WO | WO 2014/047501 | 3/2014 |
| WO | WO 2012/068437 | 4/2014 |
| WO | WO 2012/068459 | 4/2014 |
| WO | WO 2013/058932 | 4/2014 |
| WO | WO 2014/051632 | 4/2014 |
| WO | WO 2014/051635 | 4/2014 |
| WO | WO 2014/055059 | 4/2014 |
| WO | WO 2013/052901 | 5/2014 |
| WO | WO 2014/152301 | 9/2014 |

(56) References Cited

FOREIGN PATENT DOCUMENTS

| WO | WO 2015/012449 | 1/2015 |
|----|----------------|--------|
| WO | WO 2015/039178 | 3/2015 |
| WO | WO 2015/054272 | 4/2015 |
| WO | WO 2015/057698 | 4/2015 |
| WO | WO 2015/099721 | 7/2015 |
| WO | WO 2015/127499 | 9/2015 |
| WO | WO 2015/127566 | 9/2015 |
| WO | WO 2015/134755 | 10/2015 |
| WO | WO 2015/195772 | 12/2015 |
| WO | WO 2016/038374 | 3/2016 |
| WO | WO 2017/044903 | 3/2017 |

OTHER PUBLICATIONS

Hayashi et al: "Wave to Me: Human Factors in Computing Systems", ACM, 2 Penn Plaza, Suite 701 New York, NY 10121-0701 USA, Apr. 26, 2014, pp. 3453-3462.

Unknown, National Semiconductor's Temperature Sensor Handbook, Nov. 1, 1997, retrieved from the Internet at http://shrubbery.net/~heas/willem/PDF/NSC/temphb.pdf on Aug. 11, 2016, pp. 1-40.

Notice of Allowance for U.S. Appl. No. 15/146,649, dated Feb. 27, 2018, 7 pages.

Notice of Allowance for U.S. Appl. No. 15/146,763, dated Oct. 4, 2017, 8 pages.

Notice of Allowance for U.S. Appl. No. 15/338,215, dated May 21, 2018, 8 pages.

Office Action for U.S. Appl. No. 15/146,134, dated May 14, 2018, 21 pages.

Office Action for U.S. Appl. No. 15/146,649, dated Oct. 6, 2017, 6 pages.

Office Action for U.S. Appl. No. 15/146,749, dated Mar. 19, 2018, 11 pages.

Office Action for U.S. Appl. No. 15/146,749, dated Oct. 4, 2017, 9 pages.

Office Action for U.S. Appl. No. 15/260,293, dated Jun. 1, 2018, 23 pages.

Office Action for U.S. Appl. No. 15/260,294, dated Feb. 16, 2018, 19 pages.

Office Action for U.S. Appl. No. 15/260,295, dated Apr. 18, 2018, 16 pages.

Office Action for U.S. Appl. No. 15/260,297, dated Feb. 9, 2018, 17 pages.

Office Action for U.S. Appl. No. 15/260,299, dated Jun. 1, 2018, 14 pages.

Office Action for U.S. Appl. No. 15/260,301, dated Feb. 9, 2018, 9 pages.

Office Action for U.S. Appl. No. 15/336,789, dated Aug. 10, 2017, 14 pages.

Office Action for U.S. Appl. No. 15/336,789, dated Feb. 22, 2018, 15 pages.

Office Action for U.S. Appl. No. 15/336,791, dated Mar. 2, 2018, 13 pages.

Office Action for U.S. Appl. No. 15/336,792, dated Mar. 29, 2018, 12 pages.

Office Action for U.S. Appl. No. 15/336,792, dated Oct. 10, 2017, 12 pages.

Office Action for U.S. Appl. No. 15/336,793, dated May 23, 2018, 18 pages.

Office Action for U.S. Appl. No. 15/338,215, dated Nov. 15, 2017, 11 pages.

Search Report for International Application No. PCT/US2016/030291, dated Sep. 7, 2016, 11 pages.

Search Report for International Application No. PCT/US2016/030827 dated Sep. 7, 2016, 13 pages.

Search Report for International Application No. PCT/US2016/030829, dated Sep. 7, 2016, 15 pages.

Search Report for International Application No. PCT/US2016/030835, dated Sep. 7, 2016, 13 pages.

Search Report for International Application No. PCT/US2016/030836, dated Sep. 7, 2016, 11 pages.

Search Report for International Application No. PCT/US2016/030837, dated Sep. 7, 2016, 13 pages.

Search Report for International Application No. PCT/US2016/051176, dated Feb. 16, 2017, 20 pages.

Search Report for International Application No. PCT/US2017/012217, dated Mar. 31, 2017, 14 pages.

Search Report for International Application No. PCT/US2017/012218, dated Mar. 31, 2017, 14 pages.

Search Report for International Application No. PCT/US2017/012221, dated Mar. 31, 2017, 13 pages.

Search Report for International Application No. PCT/US2017/030890, dated Jun. 21, 2017, 13 pages.

Search Report for International Application No. PCT/US2017/054915, dated Jan. 16, 2018, 14 pages.

Examination Report for Australian Application No. 2016257458, dated May 7, 2018, 4 pages.

Examination Report for Australian Application No. 2016257459, dated May 4, 2018, 3 pages.

First Examination Report for New Zealand Application No. 737432, dated Jun. 11, 2018, 6 pages.

First Examination Report for New Zealand Application No. 737663, dated Jun. 11, 2018, 3 pages.

Written Opinion for Singapore Application No. 11201708996V, dated Dec. 27, 2017, 6 pages.

Written Opinion for Singapore Application No. 11201708997W, dated Jan. 10, 2018, 9 pages.

Written Opinion for Singapore Application No. 11201709002Y, dated Feb. 7, 2018, 5 pages.

* cited by examiner

THERMOSTAT WITH DIRECTION HANDOFF FEATURES

CROSS-REFERENCE TO RELATED APPLICATIONS

This application is a continuation-in-part of U.S. patent application Ser. No. 15/338,215 filed Oct. 28, 2016. This application is also a continuation-in-part of U.S. patent application Ser. No. 15/338,221 filed Oct. 28, 2016. This application is also a continuation-in-part of U.S. patent application Ser. No. 15/336,792 filed Oct. 28, 2016, which claims priority to U.S. Provisional Application No. 62/247,672 filed Oct. 28, 2015, U.S. Provisional Application No. 62/274,750 filed Jan. 4, 2016, U.S. Provisional Application No. 62/275,204 filed Jan. 5, 2016, U.S. Provisional Application No. 62/275,202 filed Jan. 5, 2016, U.S. Provisional Application No. 62/275,199 filed Jan. 5, 2016, and U.S. Provisional Application No. 62/275,711 filed Jan. 6, 2016. This application is also a continuation-in-part of U.S. patent application Ser. No. 15/336,789 filed Oct. 28, 2016, which claims priority to U.S. Provisional Application No. 62/247,672 filed Oct. 28, 2015, U.S. Provisional Application No. 62/274,750 filed Jan. 4, 2016, U.S. Provisional Application No. 62/275,204 filed Jan. 5, 2016, U.S. Provisional Application No. 62/275,202 filed Jan. 5, 2016, U.S. Provisional Application No. 62/275,199 filed Jan. 5, 2016, and U.S. Provisional Application No. 62/275,711 filed Jan. 6, 2016. This application is also a continuation-in-part of U.S. patent application Ser. No. 15/397,722 filed Jan. 3, 2017, which is a continuation-in-part of U.S. patent application Ser. No. 15/336,791 filed Oct. 28, 2016, which claims priority to U.S. Provisional Application No. 62/247,672 filed Oct. 28, 2015, U.S. Provisional Application No. 62/274,750 filed Jan. 4, 2016, U.S. Provisional Application No. 62/275,204 filed Jan. 5, 2016, U.S. Provisional Application No. 62/275,202 filed Jan. 5, 2016, U.S. Provisional Application No. 62/275,199 filed Jan. 5, 2016, and U.S. Provisional Application No. 62/275,711 filed Jan. 6, 2016. The entirety of each of these applications is incorporated by reference herein.

BACKGROUND

The present disclosure relates generally to HVAC control devices. The present disclosure relates more particularly to thermostats.

Navigation through a building can be difficult for individuals unfamiliar with the building layout since the layout of each building may be unique. Navigating a building may require an individual to pick up a map brochure from a front desk or request directions from other occupants of the building while navigating through the building. In the event of a building emergency, occupants can follow exit signs to the nearest exit. However, exit signs are only useful in case of a building evacuation. Building occupants do not conventionally have a method for receiving directions to respond to a shooter lockdown, a tornado, a flood, and other emergency situations. Additionally, finding a particular room or area in a building can be challenging in buildings with complex or unfamiliar layouts.

SUMMARY

One implementation of the present disclosure is a thermostat for a building. The thermostat includes an occupancy sensor configured to collect occupancy data. The thermostat includes a communications interface configured to communicate with one or more display devices in the building and a user interface configured to display information to a user and receive input from the user. The thermostat includes a processing circuit configured to identify the user based on the occupancy data and generate building navigation directions based on the identity of the user and cause the user interface to display at least a portion of the building navigation directions. The processing circuit is configured to cause the communications interface to send at least a portion of the building navigation directions to at least one of the devices in the building. In some embodiments, the display devices are thermostat devices.

In some embodiments, the portion of the building navigation directions are a series of steps. The portion of the building navigation directions may be a first portion and a second portion. The first portion may be displayed by the thermostat while the second portion may be sent to at least one of the display devices. The first portion may be a first step and/or first set of steps. The second portion may be a second step and/or second set of steps.

In some embodiments, the communications interface is configured to receive locations of the display devices in the building from a building management system.

In some embodiments, the processing circuit is configured to cause the communications interface to send the directions to at least one of the display devices in the building based on the locations of the display devices in the building and the building navigation directions. The building navigation directions may include a route to a destination.

In some embodiments, the communications interface is configured to communicate with a user device and receive a user schedule from the user device. The processing circuit may be configured to generate the building navigation directions based on the user schedule.

In some embodiments, the communications interface is configured to communicate with a building management system and receive user information associated with the identified user. In some embodiments, the processing circuit is configured to generate the building navigation directions based on the user information. The user information includes at least one of an indication that the user is handicapped and a schedule of the user.

In some embodiments, the processing circuit is configured to generate alternate route directions in response to the user information indicating that the identified user is handicapped, cause the user interface to display at least a portion of the alternate route directions when the user information indicates that the user is handicapped, and cause the communications interface to send at least a portion of the alternate route directions to at least one of the display devices in the building.

In some embodiments, the portion of the alternate route directions are a series of steps. The portion of the alternate route directions may be a first portion and a second portion. The first portion may be displayed by the thermostat while the second portion may be sent to at least one of the display devices. The first portion may be a first step and/or first set of steps. The second portion may be a second step and/or second set of steps.

Another implementation of the present disclosure is a thermostat for a building. The thermostat includes an occupancy sensor configured to collect occupancy data, a user interface configured to display information to a user and receive input from the user, and a processing circuit. The processing circuit is configured to identify the user based on the occupancy data, generate building navigation directions based on the identity of the user, and cause the user interface to display the building navigation directions.

In some embodiments, the thermostat includes a communications interface configured to communicate with one or more other thermostats in the building. In some embodiments, the processing circuit is configured to cause the communications interface to send at least a portion of the building navigation directions to at least one of the other thermostats in the building.

In some embodiments, the processing circuit is configured to cause the communications interface to send at least a portion of the directions to at least one of the other thermostats in the building based on locations of the other thermostats in the building and the building navigation directions. The building navigation directions may include a route to a destination.

In some embodiments, the user interface is configured to receive a direction request from a user, the direction request includes a request for directions to a particular area of the building.

In some embodiments, the thermostat includes a communications interface configured to communicate with a user device and receive a user schedule from the user device. The processing circuit may be configured to generate the building navigation directions based on the user schedule.

In some embodiments, the thermostat includes a communications interface configured to communicate with a building management system and receive user information associated with the identified user. The processing circuit may be configured to generate the building navigation directions based on the user information. The user information may include at least one of an indication that the user is handicapped and a schedule of the user.

In some embodiments, the processing circuit is configured to generate alternate route directions in response to the user information indicating that the identified user is handicapped and cause the user interface to display at least a portion of the alternate route directions in response to the user information indicating that the user is handicapped.

In some embodiments, the processing circuit is configured to identify the user based on the occupancy data by identifying a facial feature of the user when the occupancy sensor is a camera and the occupancy data is video data. The processing circuit may be configured to identify the user based on the occupancy data by identifying voice biometrics of the user when the occupancy sensor is a microphone and the occupancy data is audio data.

Another implementation of the present disclosure is a method for displaying building navigation directions via a thermostat in a building. The method includes collecting occupancy data from an occupancy sensor and identifying a user based on the occupancy data. The method includes generating the building navigation directions based on the identity of the user and causing a user interface to display the building navigation directions.

In some embodiments, the method includes receiving locations of one or more other thermostats in the building via a communications interface.

In some embodiments, the method includes causing the communications interface to send at least a portion of the building navigation directions to at least one of the other thermostats in the building based on the locations of the other thermostats in the building and the building navigation directions. The building navigation directions may include a route to a destination.

In some embodiments, the method includes receiving user information associated with the identified user. In some embodiments generating the building navigation directions is based on the user information. The user information may include at least one of an indication that the user is handicapped and a schedule of the user.

In some embodiments, the method includes generating alternate route directions in response to the user information indicating that the identified user is handicapped and causing the user interface to display at least a portion of the alternate route directions when the user information indicates that the user is handicapped.

In some embodiments, the method includes receiving a direction request from a user via the user interface. The direction request may include a request for directions to a particular area of the building and generating route directions based on the direction request. The method may include causing the user interface to display the route directions.

Another implementation of the present disclosure is a first thermostat of a building. The first thermostat includes a communications interface configured to communicate with at least one of a second thermostat or a network server, a user interface configured to display information to a user and receive input from the user, and a processing circuit. The processing circuit is configured to generate building navigation direction data for user navigation through the building, cause the user interface to display a first building navigation direction based on the generated building navigation direction data, and cause, via the communications interface, the second thermostat to display a second building navigation direction on a second display of the second thermostat based on the generated building navigation direction data.

In some embodiments, the processing circuit is configured to cause, via the communications interface, the second thermostat to display the second building navigation direction on the second display of the second thermostat by communicating with at least one of the second thermostat or the network server via the communications interface.

In some embodiments, the first thermostat is mounted on a first wall of the building and the second thermostat is mounted on a second wall of the building. The first thermostat and the second thermostat are configured to control environmental conditions of the building by generating control signals for controlling building equipment.

In some embodiments, the processing circuit is configured to receive, via the communication interface, a first indication of a first emergency relating to the building and generate the building navigation data based on the first indication of the first emergency. In some embodiments, the first building navigation direction and the second building navigation direction direct a user to follow an evacuation route, the first thermostat and the second thermostat positioned along the evacuation route.

In some embodiments, the processing circuit is configured to receive, via the communication interface, the first indication of the first emergency from a wearable device of an occupant of the building. The first indication indicates that the occupant is experiencing a health emergency and includes a location of the occupant in the building. The processing circuit generates the building navigation data based on the location of the occupant, a location of the first thermostat, and a location of the second thermostat. The first building navigation direction and the second building navigation direction direct a caregiver towards the location of the occupant.

In some embodiments, the first indication of the first emergency comprises a first location of an active shooter in the building as determined by a shot detection system configured to detect a location of the active shooter within the building. The processing circuit is configured to generate the building navigation data based on a location of the first thermostat, a location of the second thermostat, and the first location of the active shooter, and determine, based on the building navigation data, the first building navigation direction and the second building navigation direction, The first building navigation direction and the second building navigation direction direct a user to evacuate the building on a first route that avoids the shooter within the building. The processing circuit is also configured to receive, via the communication interface, a second indication of the first emergency comprising a second location of the active shooter in the building and update the first building navigation direction and the second building navigation direction based on the location of the first thermostat, the location of the second thermostat, and the second location of the active shooter. The updated first building navigation direction and the updated second building navigation direction direct the user to evacuate the building on a second route that avoids the shooter within the building.

In some embodiments, the processing circuit is also configured to receive, via the communication interface, a second indication of a second emergency relating to the building, determine that the second emergency has a higher priority than the first emergency, and generate the building navigation data based on the second indication of the second emergency.

In some embodiments, the processing circuit is configured to receive one or more data streams via the communications interface. The one or more data streams include a plurality of messages indicating an emergency associated with the building. The processing circuit is also configured to analyze the one or more data streams to identify a type of emergency within the building and generate the building navigation data based on the received one or more data streams and the identified type of emergency within the building. In some embodiments, the one or more data streams include at least one of a weather data stream indicating weather conditions associated with the building, a news data stream indicating one or more events associated with the building, or a social media data stream indicating one or more social media postings or comments indicating an emergency.

Another implementation of the present disclosure is a method for displaying navigation directions in a building. The method includes providing a communication session between a first thermostat of a building and at least one of a second thermostat or a network server, generating, by the first thermostat, building navigation direction data for user navigation through the building, displaying, on a first display of the first thermostat, a first building navigation direction based on the generated building navigation direction data, and causing, by the first thermostat, a second display of the second thermostat to display a second building navigation direction based on the generated building navigation direction data.

In some embodiments, causing, by the first thermostat, the second display of the second thermostat to display the second building navigation direction includes communicating, by the first thermostat, with at least one of the second thermostat or the network server via the communication session.

In some embodiments, the method also includes controlling, by the first thermostat and the second thermostat, environmental conditions of the building by generating control signals for controlling building equipment.

In some embodiments, the method also includes receiving one or more data streams via the communications interface. The one or more data streams includes a plurality of messages indicating an emergency associated with the building. The method also includes analyzing the one or more data streams to identify a type of emergency within the building and generating the building navigation data based on the received one or more data streams and the identified type of emergency within the building.

In some embodiments, the method also includes receiving, by the first thermostat, a first indication of a first emergency relating to the building and generating, by the first thermostat, the building navigation data based on the first indication of the first emergency. In some embodiments, receiving, by the first thermostat, a first indication of a first emergency relating to a building includes communicating with a social media server to monitor social media activity relating to the building.

In some embodiments, the first indication of the first emergency includes a first location of an active shooter in the building as determined by a shot detection system configured to detect a location of the active shooter within the building, the method further comprising. The method includes generating the building navigation data based on a location of the first thermostat, a location of the second thermostat, and the first location of the active shooter and determining, based on the building navigation data, the first building navigation direction and the second building navigation direction. The first building navigation direction and the second building navigation direction direct a user to evacuate the building on a first route that avoids the shooter within the building. The method also includes receiving, via the communication interface, a second indication of the first emergency comprising a second location of the active shooter in the building and updating the first building navigation direction and the second building navigation direction based on the location of the first thermostat, the location of the second thermostat, and the second location of the active shooter. The updated first building navigation direction and the updated second building navigation direction direct the user to evacuate the building on a second route that avoids the shooter within the building.

In some embodiments, the method also includes receiving, by the first thermostat, a second indication of a second emergency relating to the building, determining, by the first thermostat, that the second emergency has a higher priority than the first emergency, and generating the building navigation data based on the second indication of the second emergency.

Another implementation of the present disclosure is a system for displaying navigation directions in a building. The system includes an emergency sensor configured to provide data relating to an emergency in the building and a first thermostat. The first thermostat includes a communications interface configured to communicate with at least one of the emergency sensor, a second thermostat, or a network server, a user interface configured to display information to a user and receive input from the user, and a processing circuit. The processing circuit is configured to generate building navigation direction data for user navigation through the building based on data provided by the emergency sensor, cause the user interface to display a first building navigation direction based on the generated building navigation direction data, and cause, via the communications interface, the second thermostat to display a second building navigation direction on a second display of the second thermostat based on the generated building navigation direction data.

In some embodiments, the processing circuit is configured to cause, via the communications interface, the second thermostat to display the second building navigation direction on the second display of the second thermostat by communicating with at least one of the second thermostat or the network server via the communications interface.

In some embodiments, the first thermostat is mounted on a first wall of the building and the second thermostat is mounted on a second wall of the building, wherein the first thermostat and the second thermostat are configured to control environmental conditions of the building by generating control signals for controlling building equipment.

In some embodiments, the data provided by the emergency sensor comprises an indication of a location of an emergency in the building. The first building navigation direction and the second building navigation direction direct a user to follow an evacuation route that avoids the location of the emergency.

In some embodiments, the system also includes a second emergency sensor operable to provide second data relating to a second emergency in the building. The processing circuit is configured to determine that the second emergency has a high priority than the emergency and generate the building navigation data based on the second data relating to the second emergency.

In some embodiments, the emergency sensor includes one or more of a smoke detector, a carbon monoxide detector, a fire pull handle, a panic button, a sprinkler system, an automatic door control system, or a gunshot detection system.

DETAILED DESCRIPTION

Overview

Figure 1:
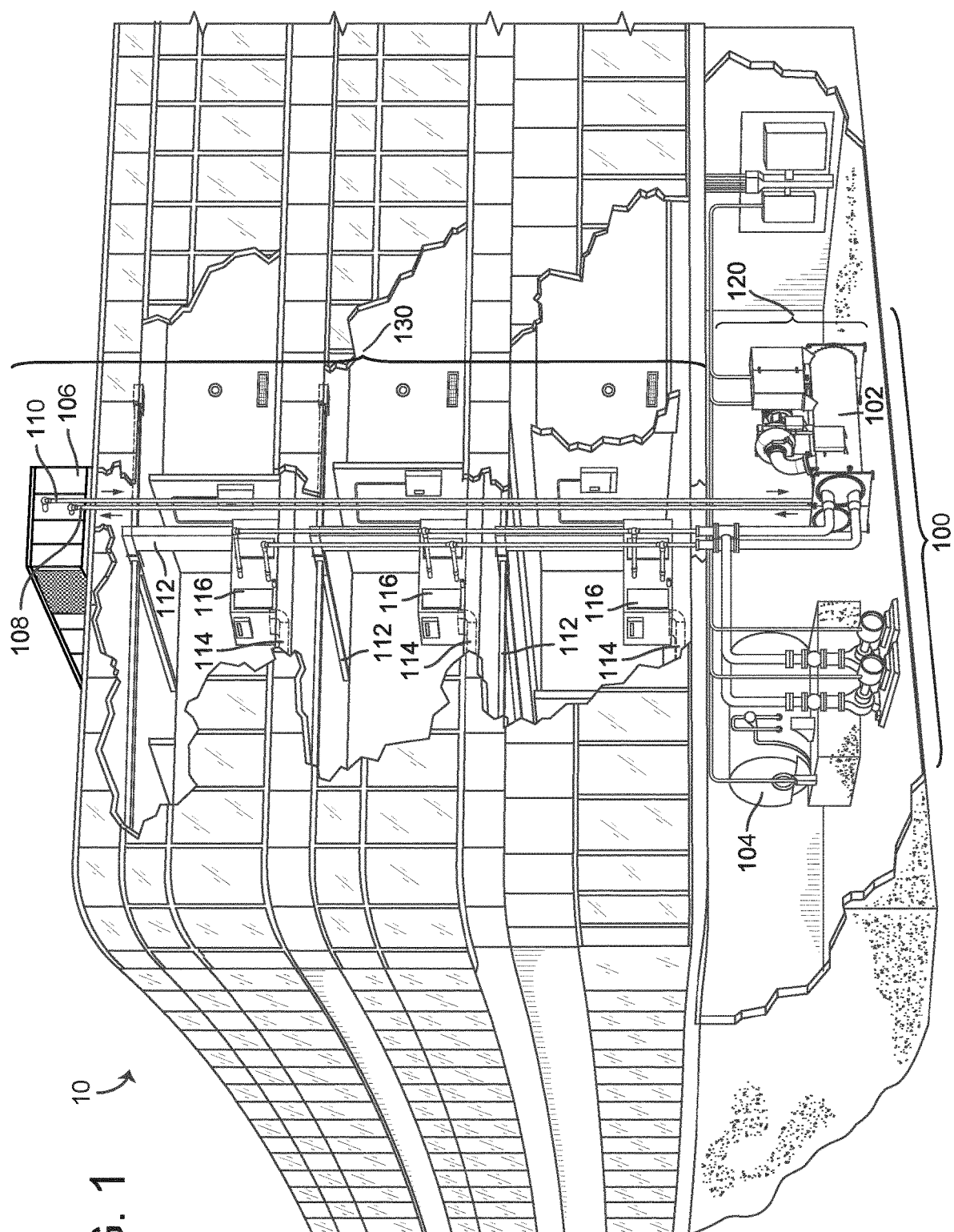
FIG. 1 is a schematic drawing of a building equipped with a HVAC system, according to an exemplary embodiment.

Referring generally to the FIGURES, systems and methods for displaying building navigation directions with a display device are shown, according to various exemplary embodiments. Several examples of display devices which can be configured for building navigation and messaging features are described in detail in U.S. Provisional Patent Application No. 62/247,672 filed Oct. 28, 2015, U.S. Provisional Patent Application No. 62/275,199 filed Jan. 5, 2016, U.S. Provisional Patent Application No. 62/274,750 filed Jan. 4, 2016, U.S. Provisional Patent Application No. 62/275,202 filed Jan. 5, 2016, U.S. Provisional Patent Application No. 62/275,204 filed Jan. 5, 2016, U.S. Provisional Patent Application No. 62/275,711 filed Jan. 6, 2016, U.S. patent application Ser. No. 15/336,793 filed Oct. 28, 2016, U.S. patent application Ser. No. 15/336,792 filed Oct. 28, 2016, U.S. patent application Ser. No. 15/336,789 filed Oct. 28, 2016, and U.S. patent application Ser. No. 15/336,791 filed Oct. 28, 2016. The entire disclosure of each of these patent applications is incorporated by reference herein. In some embodiments, the display device is configured to display directions to an occupant of the building. The directions may be navigation directions to a location in the building (e.g., a conference room, an office, etc.). In various embodiments, the display device may display emergency directions to the occupant when there is a building emergency. The building emergency may be a storm, a tornado, a fire, and active shooter, and/or any other building emergency. The emergency directions can instruct the occupant how to respond to the building emergency. The emergency directions may instruct the occupant to evacuate the building and may give the occupant route directions to the nearest building exit. In various embodiments, the emergency directions may instruct the occupant to hide and lock doors and windows, take shelter under a desk or table, and/or any other instruction for surviving a building emergency.

In some embodiments, the display device may communicate to a network. In some embodiments, the display device can connect various servers and systems. The display device may communicate to other display devices, mobile devices, and building management systems over the servers and/or through ad hoc communication. In some embodiments, the display device may be configured to determine a priority for displaying directions. The display device may be configured to opportunistically display building event notifications. The display device may be configured to connect to a cellular device and display directions based on mobile applications running on the cellular device. Further, the display device may be configured to perform occupant identification and may retrieve information based on the meeting schedule of an identified individual and display directions to certain conference rooms or locations in the building based on the identified occupant and a schedule associated with the identified occupant.

In some embodiments, the display device may be configured to look up directions for an individual. The individual may be able to input a conference room, office location, and/or any other location into a user interface of the display device. The display device may be configured to display directions to the request location.

In the event of an emergency, the display device may be configured to display emergency response directions, direct a user to an exit, and prompt the user to remove the display device from the wall. Once removed, the display device may use GPS coordinates to direct an individual to the nearest exit, safe location, fallout shelter, and/or any other location in the event of an emergency. In some embodiments, the display device includes a battery and a battery controller circuit. When the user removes the display device from the wall, the battery controller circuit may be configured to cause the batter to power the display device.

In some embodiments, the display device may be communicatively connected to one or more building display devices. In some embodiments, the display device may be configured to push and/or send display directions to the building display devices. In some embodiments, the display device is configured to determine what building display devices are located on route to a destination. In some embodiments, the display devices selectively send the directions to display devices that are located on route to the destination.

Building Management System and HVAC System

Figure 2:
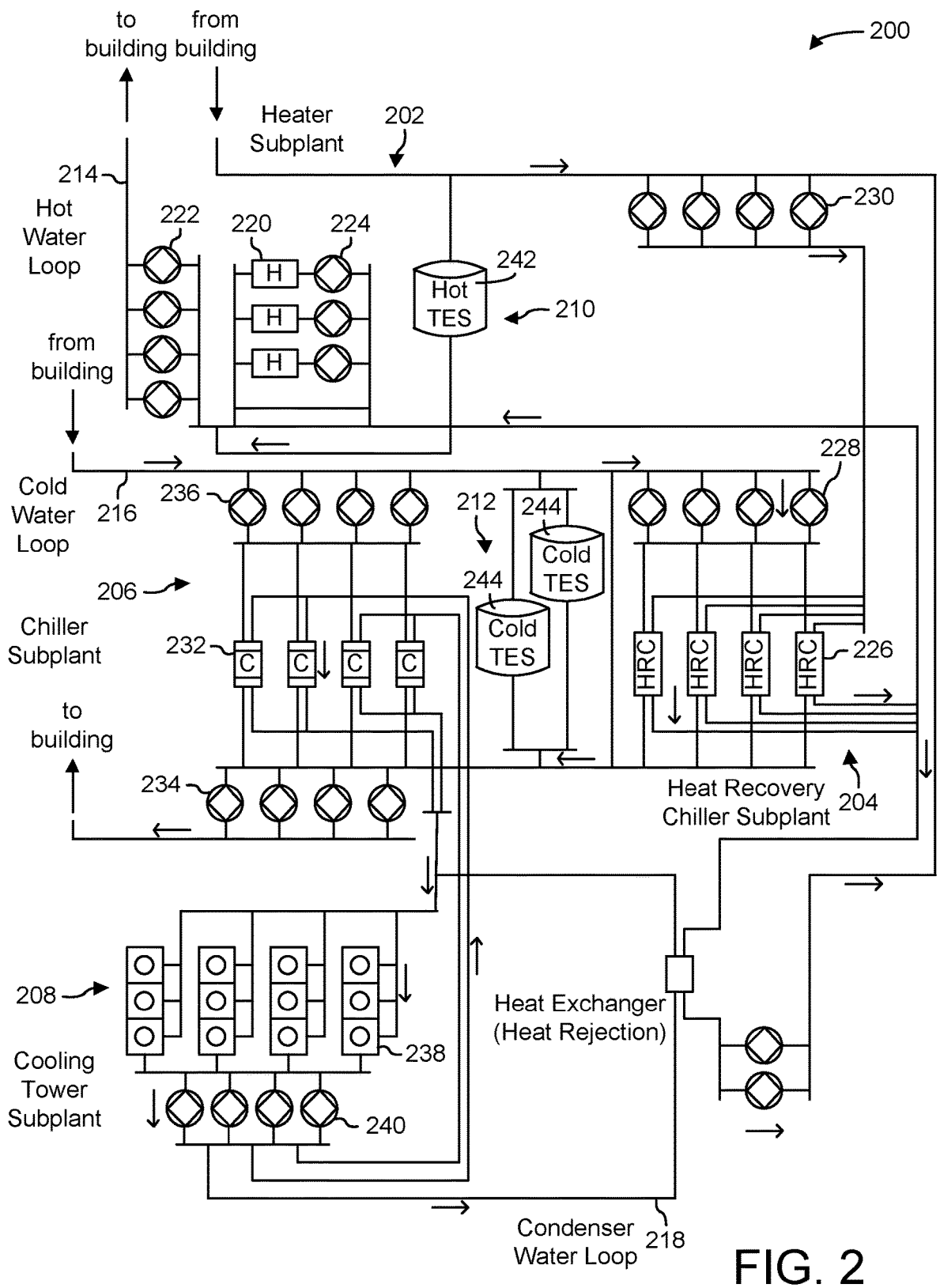
FIG. 2 is a block diagram of a waterside system that may be used in conjunction with the building of FIG. 1, according to an exemplary embodiment.
Figure 3:
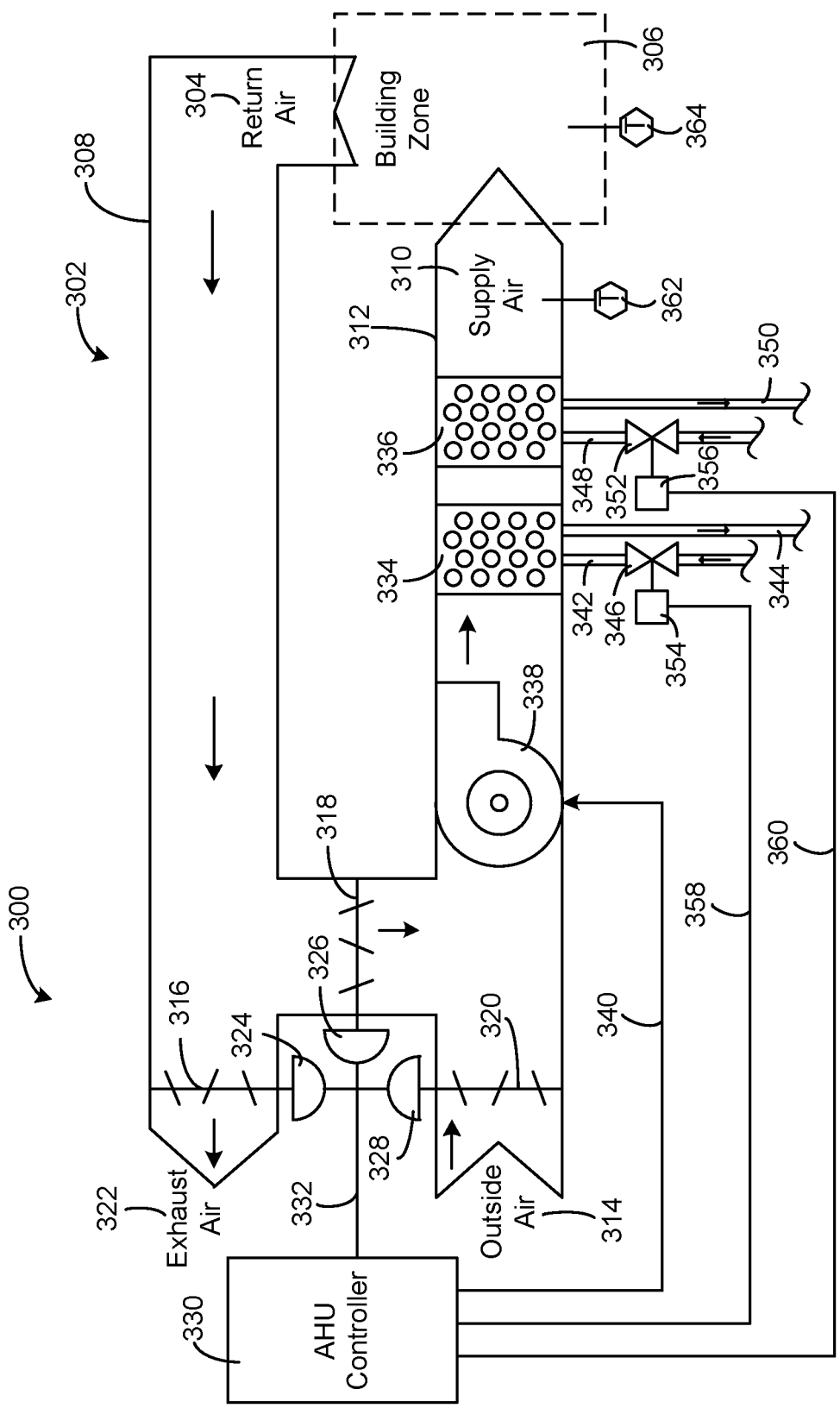
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Display Device with Building Navigation Features

Figure 4:
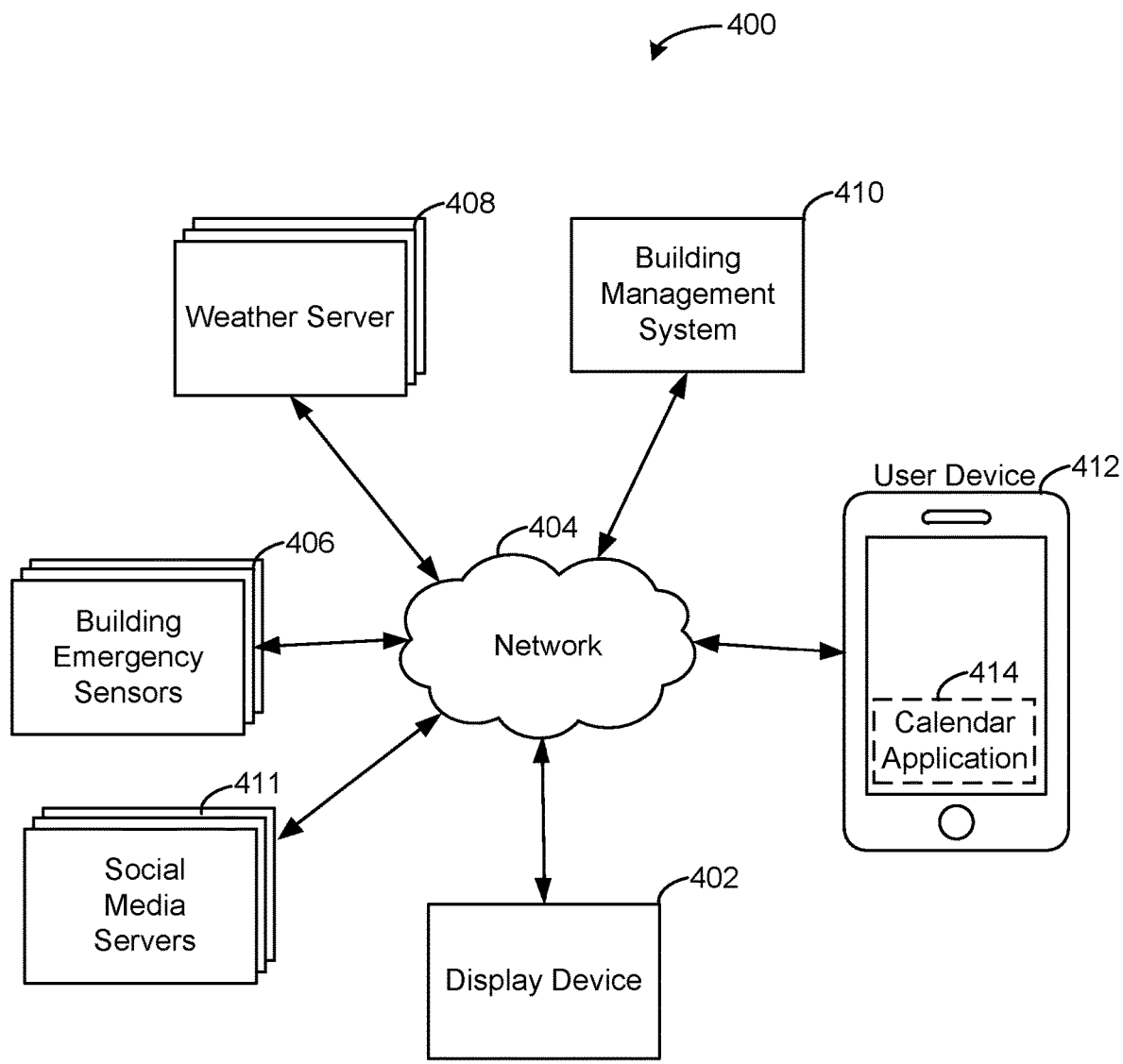
FIG. 4 is a block diagram of a communications system located in the building of FIG. 1, according to an exemplary embodiment.

Referring now to FIG. 4, a block diagram of communications system 400 is shown, according to an exemplary embodiment. System 400 can be implemented in a building (e.g. building 10) and is shown to include display device 402, network 404, building emergency sensor(s) 406, weather server(s) 408, building management system 410, social media server(s) 411, and user device 412. System 400 connects devices, systems, and servers via network 404 so that emergency information, navigation directions, and other information can be passed between devices (e.g., display device 402, user device 412, building emergency sensor(s) 406) and servers and systems (e.g., social media server(s) 411, weather server(s) 408, and building management system 410).

In some embodiments, network 404 communicatively couples the devices, systems, and servers of system 400. In some embodiments, network 404 is at least one of and/or a combination of a Wi-Fi network, a wired Ethernet network, a Zigbee network, a Bluetooth network, and/or any other wireless network. Network 404 may be a local area network or a wide area network (e.g., the Internet, a building WAN, etc.) and may use a variety of communications protocols (e.g., BACnet, IP, LON, etc.). Network 404 may include routers, modems, and/or network switches. Network 404 may be a combination of wired and wireless networks.

In some embodiments, display device 402 is configured to receive emergency information and navigation directions via network 404. In some embodiments, display device 402 is a wall mounted device with a display screen. For example, display device 402 can be a thermostat, a humidistat, a light controller, and any other wall mounted device with a display screen. In some embodiments, display device 402 is connected to building emergency sensor(s) 406 and receives emergency data from the building emergency sensor(s) 406. In some embodiments, building emergency sensor(s) 406 are sensors which detect building emergencies. Building emergency sensor(s) 406 can include, for example, smoke detectors, carbon monoxide detectors, fire pull handles, panic buttons, gunshot detection sensors, and any other emergency sensor. In some embodiments, the emergency sensor(s) include actuators. The actuators may be building emergency sirens, a sprinkler and/or sprinkler system, an automatic door controller and/or automatic door control system, and any other actuator used in a building. In some embodiments, building emergency sensor(s) 406 may communicate with building management system 410. Building management system 410 may sensor data from the building emergency sensor(s) 410. In various embodiments, building management system 410 may send the sensor data and/or emergency information associated with the sensor data to display device 402.

In some embodiments, display device 402 is communicatively coupled to weather server(s) 408 via network 404. In some embodiments, display device 402 is configured to receive weather alerts (e.g., high and low daily temperature, five day forecast, thirty day forecast, etc.) from the weather server(s) 408. Display device 402 may be configured to receive emergency weather alerts (e.g., flood warnings, fire warnings, thunder storm warnings, winter storm warnings, etc.) from the weather server(s) 408. In some embodiments, display device 402 is configured to display emergency warnings via a user interface of display device 402 when display device 402 receives an emergency weather alert from weather server(s) 408. Display device 402 may be configured to display emergency warnings based on the data received from building emergency sensor(s) 406. In some embodiments, display device 402 causes a siren to alert occupants of the building of an emergency, causes all doors to become locked and/or unlocked, causes an advisory message be broadcast through the building, and/or controls any other actuator or system necessary for responding to a building emergency. In some embodiments, the building management system 410 communicates with weather server 408. Building management system 410 may communicate (e.g., send) information from weather server 408 to display device 402.

In some embodiments, display device 402 is configured to communicate with building management system 410 via network 404. Display device 402 may be configured to transmit environmental setpoints (e.g., temperature setpoint, humidity setpoint, etc.) to building management system 410. In some embodiments, building management system 410 is configured to cause zones of a building (e.g., building 10) to be controlled to the setpoint received from display device 402. For example, building management system 410 may be configured to control the temperature, humidity, lighting, or other environmental conditions of a building based on the setpoints or control signals received from display device 402. In some embodiments, building management system 410 is configured to transmit emergency information to display device 402. The emergency information can include, for example, a notification of a shooter lockdown, a tornado warning, a flood warning, a thunderstorm warning, and/or any other warning. In some embodiments, building management system 410 is connected to various weather servers and/or other web servers from which building management system 410 receives emergency warning information.

In some embodiments, the display device 402 is configured to communicate with one or more social media server(s) 411 via network 404. Social media server(s) 411 may include, but are not limited to, servers supporting Facebook, Instagram, Twitter, Snapchat, WhatsApp, and/or other social media platforms. In some embodiments, the display device 402 may have a profile or other presence on a social media platform, such that a user may send a direct message, post, tweet, etc. to the display device 402. For example, a user may tweet at (i.e., via Twitter) or send a direct message to (e.g., via Facebook Messenger, WhatsApp, etc.) the display device 402 and/or the building management system 410 to indicate that an emergency is ongoing in a building (e.g., "@displaydevice402 a fire just started in Room X"). The display device 402 may receive such a message, tweet, post, etc., extract relevant information therefrom using a natural language processing approach, and generate emergency directions based on the extracted information. In some embodiments, the display device 402 is configured to send a message or comment to the user in response, for example using an automated chat bot approach.

In various embodiments, the display device 402 access the social media server(s) to passively monitor social media activity of one or more occupants of a building to identify events in a building and/or emergencies in a building. For example, the display device 402 may access a message sent from a first user of a social media server 411 to a second user of the social media server 411 which mentions an ongoing emergency in the building. As another example, the display device 402 may analyze pictures and/or videos posted publically by a social media user (e.g., via Snapchat, Instagram, etc.) to identify building occupancy, events in the building, emergencies in the building, etc. and respond accordingly. For example, a user may post a video that shows an active shooter in a building, and the display device 402 may receive said video, analyze said video to determine a location of the shooter in the building, and generate one or more directions to provide to one or more building occupants to help the occupants find safety. Various such interactions between the social media server(s) 411 and the display device 402 are contemplated by the present disclosure.

Display device 402 can be configured to communicate with user device 412 via network 404. In some embodiments, user device 412 communicates calendar information to display device 402. User device 412 can include any user-operable computing device such as smartphones, tablets, laptop computers, desktop computers, wearable devices (e.g., smart watches, smart wrist bands, smart glasses, etc.), and/or any other computing device. User device 412 can be a mobile device or a non-mobile device. In some embodiments, the calendar information is stored and/or entered by a user into calendar application 414. Calendar application 414 may be one or a combination of Outlook, Google Calendar, Fantastical, Shifts, CloudCal, DigiCal, and/or any other calendar application. Display device 402 may receive calendar information from the calendar application such as times and locations of appointments, times and locations of meetings, information about the expected location of the user, and/or any other calendar information. Information about the expected location of the user may be information that the user will depart for an airport or another location at a specific time or in a range of times. Display device 402 may be configured to display direction to a user associated with user device 412 based on the calendar information stored in calendar application 414.

In various embodiments, the user device 412 provides various data and information regarding use of the user device 412 to the display device 402 and/or the building management system 410. For example, the display device 402 may collect a live feed of the usage of the user device 412 to facilitate identification and characterization of building emergencies and/or to facilitate the provision of directions to a user in case of an emergency. For example, the display device 402 may receive data relating to an emergency call made by the user device 412, the location of the user device 412 (e.g., based on GPS data collected by the user device 412), social media activity of a user of the user device 412, etc. In some embodiments, the display device 402 activates a microphone and/or camera of the user device 412 in an emergency situation to monitor the safety of a user in an emergency situation.

In some embodiments, a user may press a button on a user interface of display device 402 indicating a building emergency. The user may be able to indicate the type of emergency (e.g., fire, flood, medical, active shooter, etc.). Display device 402 may communicate an alert to building management system 410, user device 412, social media server 411 and/or any other device, system, or server. For example, display device 402 may be configured to cause the social media server 411 to generate a social media notification relating to a building emergency for a user.

Figure 5:
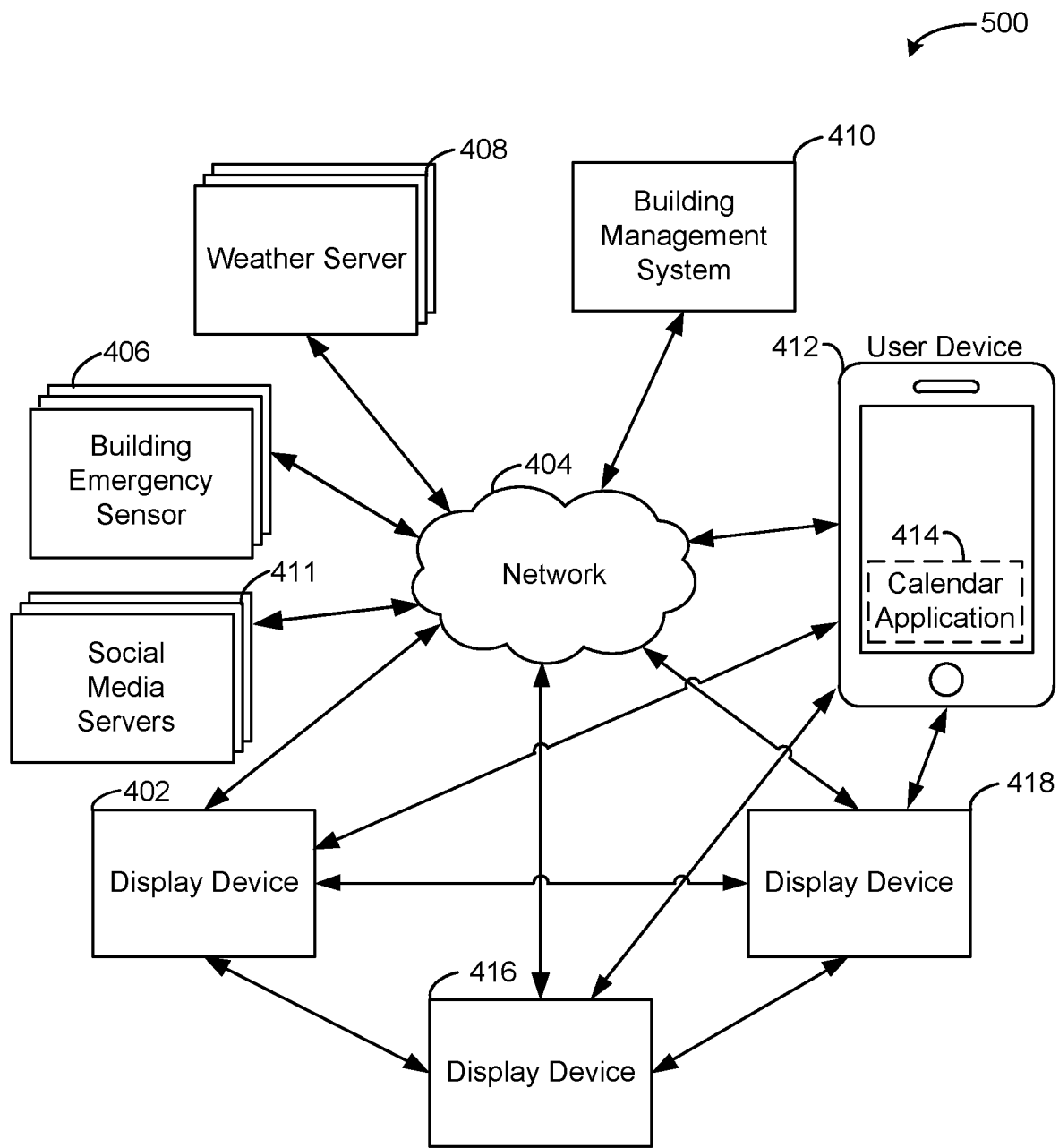
FIG. 5 is a block diagram of a communications system located in the building of FIG. 1 where the display devices are communicating ad hoc, according to an exemplary embodiment.

Referring now to FIG. 5, a block diagram of communications system 500 is shown, according to an exemplary embodiment. System 500 can be implemented in a building (e.g. building 10) and is shown to include display device 402, network 404, building emergency sensor(s) 406, weather server(s) 408, building management system 410, and user device 412. These components may be the similar or the same as described with reference to FIG. 4. System 500 connects devices, systems, and servers via network 404 so that emergency information, navigation directions, and other information can be passed between devices (e.g., display device 402, user device 412, building emergency sensor(s) 406) and servers and systems (e.g., weather server(s) 408 and building management system 410).

In some embodiments, system 500 includes display devices 416 and 418. Display devices 416 and 418 may be identical and/or similar to display device 402. In some embodiments display devices 416 and 418 have the ability to communicate to display device 402 but are different from display device 402. For example, display device 416 and display device 418 can be smart actuators, building controllers, etc., while display device 402 can be a smart thermostat. Display device 402, display device 416, and display device 418 may be located in different locations of a building (e.g., building 10). In some embodiments, display device 402, display device 416, display device 418 and user device 412 may communicate to each other ad hoc. In some embodiments, display device 402, display device 416, and display device 418 may communicate to each other via network 404. In some embodiments, ad hoc communication may be at least one of (ad hoc Wi-Fi, ad hoc Zigbee, ad hoc Bluetooth, NFC, etc.) In some embodiments, the devices form a MANET, a VANET, a SPAN, an IMANET, and/or any other ad hoc network. In some embodiments, the devices are connected and communicate via RS-485, Ethernet, and/or any other wired, wireless, or combination of wired and wireless communication method.

In some embodiments, display device 402, display device 416, display device 418 send navigation directions to one another via ad hoc communication. In some embodiments, one of the display devices determines a route for a building occupant. The route may be the fastest or shortest path to a destination (e.g., a conference room, an office, etc.). Display device may handoff the navigation directions to other display devices (e.g., display device 416, display device 418, etc.) along the path of the occupant. In some embodiments, the route may meet a need of the occupant, such as a route that will accommodate wheelchairs if the occupant is in a wheelchair or traveling with someone in a wheelchair.

In some embodiments, user device 412 is configured to communicate with display device 402, display device 416, and display device 418 via ad hoc communication. In some embodiments, user device 412 may communicate with the display devices (e.g., display device 402, display device 416, display device 418, etc.) and request navigation directions. In some embodiments, a user may check in with a display device and the display device may display navigation information for the individual associated with the user device 412. Checking in with the display device may be holding user device 412 a certain distance from the display device so that user device 412 can communicate with the display device via NFC. In various embodiments, checking in with the display device includes connecting to the display device via Wi-Fi, Bluetooth, or Zigbee and entering a password and/or username.

Figure 6:
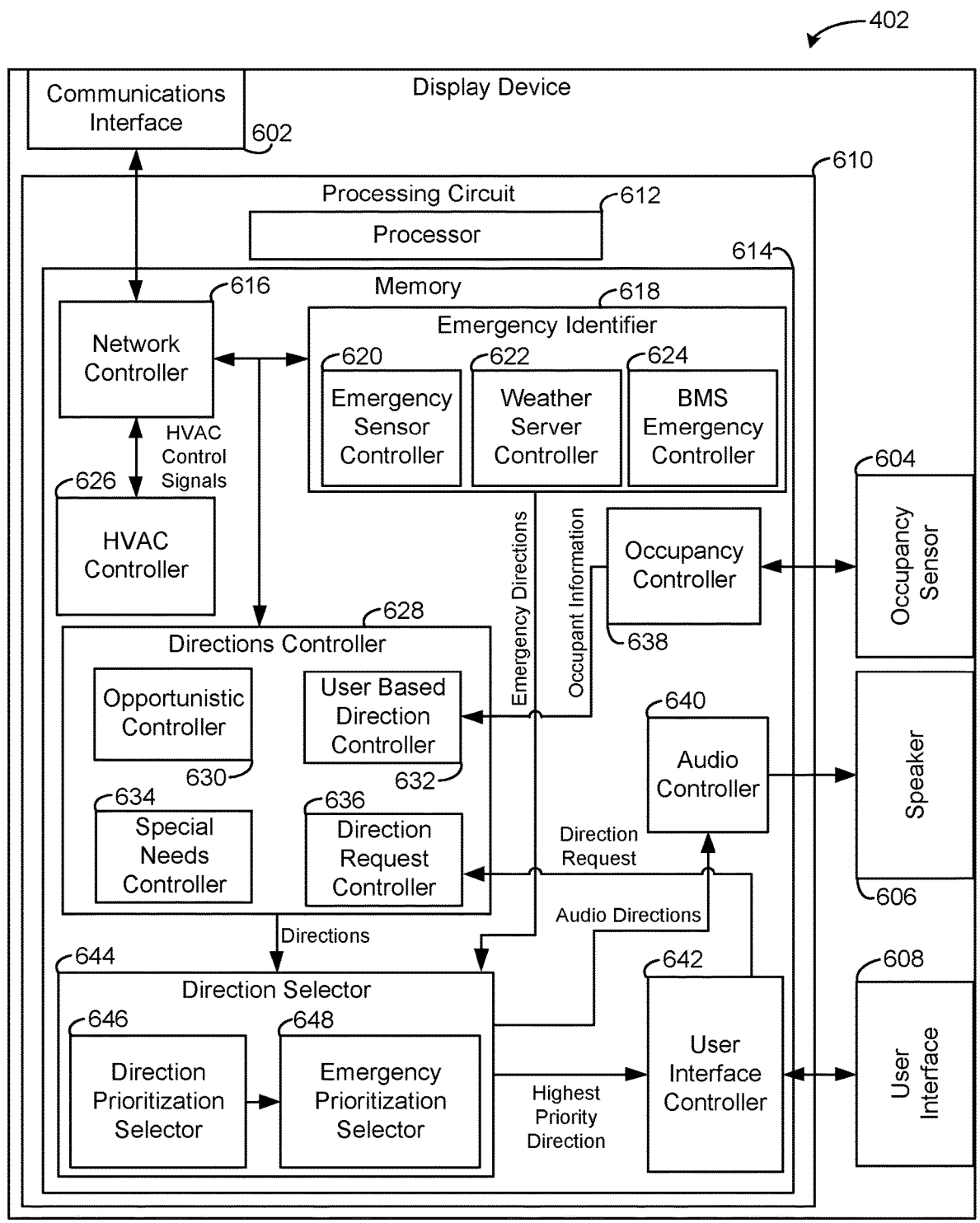
FIG. 6 is a block diagram illustrating the display device of FIGS. 4-5 in greater detail, according to an exemplary embodiment.

Referring now to FIG. 6, a block diagram illustrating display device 402 in greater detail is shown, according to an exemplary embodiment. Display device 402 is shown to include a communications interface 602, an occupancy sensor 604, a speaker 606, a user interface 608, and a processing circuit 610. Display device 402 can be configured to display directions and/or other types of information to a user via user interface 608. In some embodiments, display device 402 is configured to determine a highest priority direction and/or emergency notification and display the direction and/or emergency notification on user interface 608. In some embodiments, displaying the directions on user interface 608 is accompanied by playing the direction and/or emergency notification via speaker 606. The priority of direction and/or emergency notification may be determined based on detecting emergencies, identifying users with occupancy sensor 604, and receiving directions over communications interface 602.

Communications interface 602 may be configured to communicate with network 404 as described with reference to FIGS. 4-5. Communications interface 602 can be configured to communicate via local area networks (e.g., a building LAN), wide area networks (e.g., the Internet, a cellular network, etc.), conduct direct communications (e.g., NFC, Bluetooth, etc.) ad hoc with devices (e.g., ad hoc Wi-Fi, ad hoc Zigbee, ad hoc Bluetooth, NFC etc.), and/or with ad hoc networks (e.g., MANET, a VANET, a SPAN, an IMANET, and any other ad hoc network). In some embodiments, communications interface 602 communicates ad hoc with display device 402, display device 416, and/or display device 418. In some embodiments, communications interface 602 includes an application gateway configured to receive input from applications running on client devices. Communications interface 602 can include one or more wireless transceivers (e.g., a Wi-Fi transceiver, a Bluetooth transceiver, a NFC transceiver, a cellular transceiver, etc.) for communicating with mobile devices.

In some embodiments, communications interface 602 communicates with display device 416, display device 418, building emergency sensor(s) 406, weather server(s) 408, building management system 410, and/or user device 412 as described with reference to FIGS. 4-5 to receive environmental condition information, direction requests and/or emergency notifications. Communications interface 602 may receive navigation requests from user device 412. Communications interface 602 may receive navigation direction and/or building maps from building management system 410. In some embodiments, emergency information and/or alerts are received via communications interface 602 from building management system 410. In some embodiments, emergency information is received form building emergency sensor(s) 406. In some embodiments, emergency information is received from weather server(s) 408.

Occupancy sensor 604 may be used to detect occupancy and determine the identity of the occupant. Occupancy sensor 604 may be one or a combination of motion sensors, cameras, microphones, capacitive sensors, or any number of other sensors. For example, occupancy sensor 604 can include one or more cameras which detect heat signatures. Occupancy sensor 604 may detect separate objects and distinguish between humans and other objects. Occupancy sensor 604 can include one or more transducers which detect some characteristic of their respective environment and surroundings. Occupancy sensors, such as a camera, may be used to determine if an occupant is using a wheelchair, cane, crutches, and/or any other assistance device.

Speaker 606 may be configured to project audio. The audio may be warning messages, direction messages, alternate route suggestion messages and any other message. Speaker 606 may be any kind of electroacoustic transducer and/or combination of transducers that are configured to generate sound waves based on electrical signals. Speaker 606 may be a loudspeaker (e.g., various combinations of subwoofers, woofers, mid-range drivers, tweeters, etc.) and may broadcast messages to an entire zone and/or an entire building (e.g., building 10). In some embodiments, speaker 606 includes filters. In some embodiments, the filters are various combinations of high pass filters, low pass filters, band pass filters, etc.

User interface 608 may be a touch screen display configured to receive input from a user and display images and text to a user. In some embodiments, user interface 608 is at least one or a combination of a resistive touch screen and a capacitive touch screen (e.g., projective capacitive touch screen). In some embodiments, user interface 608 is a swept-volume display, a varifocal mirror display, an emissive volume display, a laser display, a holographic display, a light field display, and/or any other display or combination of displays. User interface 608 may be configured to display images and text to a user but may not be configured to receive input from the user. In some embodiments, user interface 608 is one or a combination of a CRT display, an LCD display, an LED display, a plasma display, and/or an OLED display.

Processing circuit 610 is shown to include a processor 612 and memory 614. Processor 612 can be a general purpose or specific purpose processor, an application specific integrated circuit (ASIC), one or more field programmable gate arrays (FPGAs), a group of processing components, or other suitable processing components. Processor 612 may be configured to execute computer code and/or instructions stored in memory 614 or received from other computer readable media (e.g., CDROM, network storage, a remote server, etc.).

Memory 614 can include one or more devices (e.g., memory units, memory devices, storage devices, etc.) for storing data and/or computer code for completing and/or facilitating the various processes described in the present disclosure. Memory 614 can include random access memory (RAM), read-only memory (ROM), hard drive storage, temporary storage, non-volatile memory, flash memory, optical memory, or any other suitable memory for storing software objects and/or computer instructions. Memory 614 can include database components, object code components, script components, or any other type of information structure for supporting the various activities and information structures described in the present disclosure. Memory 614 can be communicably connected to processor 612 via processing circuit 610 and can include computer code for executing (e.g., by processor 612) one or more processes described herein.

Memory 614 is shown to include a network controller 616, an emergency identifier 618, a HVAC controller 626, a directions controller 628, a direction selector 648, an occupancy controller 638, an audio controller 640, and user interface controller 642. Each of these components is described in greater detail below.

Network controller 616 may contain instructions to communicate with a network (e.g., network 404) and ad hoc to other devices (e.g., display device 416, display device 418, user device 412, etc.). In some embodiments, network controller 618 contains instructions to communicate over wireless and wired communication methods. In some embodiments, wireless communication methods are communicating in a Wi-Fi network, a Zigbee network, and/or a Bluetooth network via communications interface 602. In some embodiments, the communication methods are wired such as via RS-485, Ethernet (e.g., CAT5, CAT5e, etc.), and/or any other wired communication method. Network controller 616 may be configured to facilitate communication a local area network or a wide area network (e.g., the Internet, a building WAN, etc.) and may be configured to use a variety of communications protocols (e.g., BACnet, IP, LON, etc.). In some embodiments, network controller 618 facilitates ad hoc communication. The ad hoc communication may be at least one of (ad hoc Wi-Fi, ad hoc Zigbee, ad hoc Bluetooth, NFC etc.). In some embodiments, network controller 618 facilitates communication over an ad hoc network (e.g., MANET, a VANET, a SPAN, an IMANET, and any other ad hoc network).

Emergency identifier 618 can be configured to determine whether an emergency is occurring. The emergency can be an emergency inside the building (e.g., a fire, a dangerous person, a critical fault or operating condition in the BMS, etc.) or an emergency outside the building (e.g., a tornado, dangerous weather conditions, etc.). In some embodiments, emergency identifier 618 is configured to determine emergency alerts based on information received from network controller 616. Emergency identifier 618 may include emergency sensor controller 620, weather server controller 622, and BMS emergency controller 624. Emergency sensor controller 620 may be configured to communicate with building emergency sensor(s) 406 described with reference to FIGS. 4-5 via network controller 616 and communications interface 602. In some embodiments, emergency sensor controller 620 can send commands to building emergency sensor(s) 406. In some embodiments, the commands are to activate actuators, deactivate actuators, gather sensor data, etc. and are sent to emergency sensor(s) 406 and/or emergency sensor controller 620.

Emergency sensor controller 620 may receive sensor data from building emergency sensor(s) 406 via network controller 616 and communications interface 602. Emergency sensor controller 620 may be configured to analyze the sensor data and determine if an emergency is present. Emergency sensor controller 620 may determine the nature and/or location of the emergency based on the analysis of the sensor data. The nature of the emergency may be an earthquake, a fire, a gas leak, etc. Emergency sensor controller 620 may be configured to determine and/or retrieve applicable directions for the determined emergency. In some embodiments, emergency sensor controller 620 determines that an emergency is occurring when the sensor data is above and/or below a predefined threshold. For example, if emergency sensor controller 620 determines that sensor data/information indicates that carbon monoxide levels cross a predefined threshold, the air is dangerous to breath and the building should be evacuated.

In some embodiments, building emergency sensor(s) 406 are configured to determine the nature of the emergency. Emergency sensor controller 620 may be configured to receive the nature of the emergency from building emergency sensor(s) 406 via network controller 616 and communications interface 602. Emergency sensor controller 620 can be configured to generate emergency directions based on the emergency. In some embodiments, the emergency directions are to evacuate a building, hide under tables and/or desks, close windows, and any other direction relevant to an emergency situation. Emergency sensor controller 620 may send the determined emergency directions to direction selector 644.

In some embodiments, the building emergency sensor(s) 406 are configured to identify a location of an emergency in the building (e.g., a location of a fire, a location of an active shooter) and the emergency sensor controller 620 is configured to receive the location of the emergency from the building emergency sensor(s) 406 via network controller 616 and communications interface 602. In such embodiments, the emergency sensor controller 620 can be configured to generate emergency directions based on the location of the emergency, for example to direct a user away from the emergency (e.g., away from a fire, away from an active shooter, along an evacuation route that avoids a dangerous area). The emergency directions may update dynamically as the emergency moves through a building, e.g., as the emergency sensor(s) 406 detect the emergency (e.g., a fire, a gunshot) in changing locations in the building.

In some embodiments, the existence, nature, and/or location of an emergency may be determined based at least in part on live data received from the user device 412 and/or other web-based live data streams (e.g., social media). For example, the emergency identifier 618 may receive an indication of a call or message transmitted from the user device 412 to an emergency response system. As another example, the emergency identifier 618 may receive social media posts that indicate that an emergency event is occurring. The emergency identifier 618 may use this live data to identify an ongoing emergency and/or determine the nature and/or location of the emergency.

Weather server controller 622 may be configured to communicate with weather server(s) 408 as described with reference to FIGS. 4-5. Weather server controller 622 may be configured to query weather server(s) 408 for weather information and/or weather related emergency information. In some embodiments, weather server controller 622 is configured to determine emergency directions based on the information received from weather server(s) 408. The emergency directions may be sent to direction selector 644. In some embodiments, the directions are evacuate a building, hide under tables and/or desks, close windows, and any other direction relevant to an emergency situation.

BMS emergency controller 624 may be configured to communicate with building management system 410 as described with reference to FIGS. 4-5. In some embodiments, BMS emergency controller 624 may be configured to receive emergency information from building management system 410. In some embodiments, the information received is weather related emergencies, active shooter emergencies, unsafe building emergencies, and any other emergency information received from building management system 410. In some embodiments, BMS emergency controller 624 is configured to send the emergency information received form building management system 410 to direction selector 644.

In some embodiments, building management system 410 may include one or more databases which store building maps, room and meeting schedules, and/or any other information regarding a building (e.g., building 10). In some embodiments, BMS emergency controller 624 is configured to request the building information from building management system 410 and send the building related information to directions controller 628.

Still referring to FIG. 6, HVAC controller 626 may communicate with the building management system 410 via network controller 616, communications interface 602, and network 404 as described with further reference to FIGS. 4-5. HVAC controller 626 may be configured to receive temperature setpoints and humidity setpoints via user interface 608. In some embodiments, HVAC controller 626 provides a control signal to building management system 410 via network controller 616 and/or communications interface 602. The control signal may cause the building management system 410 to condition and/or heat a zone and/or building to a setpoint temperature. Further, the control signals may cause building management system 410 to achieve a humidity value in a building and/or zone based on a humidity setpoint.

HVAC controller 626 may use any of a variety of control algorithms (e.g., state-based algorithms, extremum-seeking control algorithms, PID control algorithms, model predictive control algorithms, feedback control algorithms, etc.) to determine appropriate control actions for any HVAC equipment connected to building management system 410 as a function of temperature and/or humidity. For example, if the temperature is above a temperature set point received from touch screen 202 via single-touch controller 430 and/or multi-touch controller 432, control output module 124 may determine that a cooling coil and/or a fan should be activated to decrease the temperature of an supply air delivered to a building zone. Similarly, if the temperature is below the temperature set point, HVAC controller 626 may determine that a heating coil and/or a fan should be activated to increase the temperature of the supply air delivered to the building zone. HVAC controller 626 may determine that a humidification or dehumidification component of building management system 410 should be activated or deactivated to control the ambient relative humidity to a humidity set point for a building zone.

Directions controller 628 may be configured to determine directions for an occupant or a group of occupants of a building (e.g., building 10). In some embodiments, directions controller 628 includes an opportunistic controller 630, a user based direction controller 632, a special needs controller 634, and a direction request controller 636. Opportunistic controller 630 may be configured to generate and/or determine building event directions and/or messages based on information received from the building management system 410. In some embodiments, opportunistic controller 630 is configured to receive building event information from building management system 410 and/or calendar application 414 of user device 412 as described with reference to FIGS. 4-5. In some embodiments, the event information may include an image to display on user interface 608. The event information may include all events in a building at a specific time. Opportunistic controller 630 may be configured to determine if the location of the event is nearby the location of display device 402. In some embodiments, only events that are nearby the location of the display device 402 are determined to be displayed on user interface 608.

In some embodiments, opportunistic controller 630 analyzes calendar information from one or more mobile devices (e.g., user device 412) received via network controller 616 and communications interface 602. Based on the calendar information, display device 402 may learn what events are occurring in the building. Opportunistic controller 630 may be configured to generate an event image (e.g., various combinations of logos, admission fees, locations, start and end times, etc.) relating to the event and may determine proper audio notifications to be served along with the generated event image.

User-based direction controller 632 may be configured to generate navigation directions for an occupant. In some embodiments, user based direction controller 632 may be configured to receive the identity of an occupant from occupancy controller 638. The identity may be the identity of an occupant a predetermined distance from display device 402. In some embodiments, the user based direction controller 632 may be configured to query the building automation system 410 via network controller 616 and communications interface 602 for information associated with the identified occupant. In some embodiments, building automation system 410 may reply with the name of the occupant, the schedule of the occupant, any meetings and/or events that the occupant is a participant (e.g., optional participant, required participant, etc.), and may also reply with any special needs of the occupant, such as wheel chair accessible directions. User based direction controller 632 may be configured to generate directions to any locations which the identified occupant may be scheduled to be. In some embodiments, user based direction controller 632 may be configured to communicate with a calendar application (e.g., calendar application 414) via ad hoc and/or network communications with a user device (e.g., user device 412) to determine the schedule of a building occupant. In some embodiments, user based direction controller 632 may be configured to generate arrows, building maps, audio directions, and any other form of directions. User based direction controller 632 may be configured to send the directions to direction selector 644.

Special needs controller 634 may determine if the occupant identified by user based direction controller 632 has any special needs. For example, special needs controller 634 may be configured to communicate with building management system 410 and receive any information relating to any physical and/or mental disabilities associated with the identified user. The disabilities may be that the identified occupant is deaf, mute, blind, in a wheelchair, on crutches, etc. In some embodiments, special needs controller 634 may determine building directions based on the disability of the occupant. For example, if the identified occupant is in a wheel chair, the special needs controller 634 may generate directions to a location that circumnavigates any stairs. If the identified occupant is determined to be deaf, the special needs controller 634 may be configured to generate audio directions only and not visual directions. In some embodiments, the audio direction are a series of turns (e.g., "go forward to end of hall turn right, go forward to end of hall turn left," etc.)

Direction request controller 636 may be configured to receive direction requests from user interface 608. Direction request controller may communicate with user interface controller 642 and may receive the direction request form user interface controller 642. In some embodiments, direction request controller 636 is configured to display directions to a requested location in response to a building occupant requesting directions via user interface 608. The requested location can include, for example, a conference room, a meeting room, an office, etc. In some embodiments, direction request controller 636 may be configured to display a map showing where the user is, where the destination is, the shortest route to the destination, etc. In some embodiments, direction request controller 636 is configured to generate text directions indicating which turns to make in order to navigate to the destination. Further, direction request controller 636 may be configured to generate audio messages to be played along with the visual directions.

In some embodiments, occupancy controller 638 may be configured to determine the identity of an occupant based on information received from occupancy sensor 604. The identity of the occupant may be provided to user based direction controller 632. In some embodiments, the occupancy controller 638 receives sensor input from occupancy sensor 604 where the sensor may be a camera. Occupancy controller 638 can perform digital image processing to identify the one or more users based on the digital images received from the camera. In some embodiments, digital image processing is used to identify the faces of the one or more users, the height of the one or more users, or any other physical characteristic of the one or more users. In some embodiments, the digital image processing is performed by image analysis tools such as edge detectors and neural networks. In some embodiments, the digital image processing compares the physical characteristics of the one or more users with physical characteristics of previously identified users.

In some embodiments, occupancy controller 638 receives sensor input from a microphone. The microphone can be any of a plurality of microphone types. The microphone types include, for example, a dynamic microphone, a ribbon microphone, a carbon microphone, a piezoelectric microphone, a fiber optic microphone, a laser microphone, a liquid microphone, and an audio speaker used as a microphone. In some embodiments, the occupancy controller analyzes the audio data received from the microphone. In some embodiments, occupancy controller 638 identifies one or more users based on voice biometrics of the audio received from the microphone. Voice biometrics are the unique characteristics of a speaker's voice. Voice biometrics include voice pitch or speaking style that result from the anatomy of the speaker's throat and/or mouth. In some embodiments, the voice biometrics of linked users is stored on display device 402 in occupancy controller 638. In some embodiments, the voice biometrics are stored on building management system 410 and must be retrieved by occupancy controller 638. In some embodiments, occupancy controller 638 uses a text dependent voice recognition technique. In some embodiments, occupancy controller 638 uses a text independent voice recognition technique to identify the one or more users.

In some embodiments, occupancy controller 638 uses the text dependent voice recognition technique to identify the one or more users based on a password or particular phrase spoken by one of the users. For example, the user may speak a phrase such as "This is Felix, I am home." Occupancy controller 638 can perform speech recognition to determine the spoken phrase "This is Felix, I am home" from the audio data received form the microphone. In some embodiments, occupancy controller 638 uses one or a combination of a hidden Markov models, dynamic time warping, neural networks to determine the spoken phrase, etc. Occupancy controller 638 compares the determined spoken phrase to phrases linked to users. If the phrase, "This is Felix, I am home" matches a phrase linked to a user Felix, occupancy controller 638 can identify the user as Felix. In some embodiments, the linked phrases are stored on occupancy controller 638. In various embodiments, the linked phrases are stored on building management system 410.

In some embodiments, occupancy controller 638 is configured to capture audio data from one or more users and perform pre-processing. In some embodiments pre-processing may be compressing the audio data, converting the audio data into an appropriate format, and any other pre-processing action necessary. Occupancy controller 638 may be configured to transmit the captured spoken audio data to a voice recognition server via communications interface 602 and network 404 as described with reference to FIGS. 4-5. The voice recognition server may be configured to determine the identity of the occupant and transmit the identity of the occupant to occupancy controller 638.

Audio controller 640 may be configured to receive audio directions from direction selector 644. Audio controller 640 may generate an analog signal for speaker 606 based on a digital audio signal from direction selector 644. In some embodiments, audio controller 640 may be configured to convert a digital audio signal into an analog audio signal (i.e., digital to audio conversion (DAC)). In some embodiments, audio controller 640 may contain a text to speech application program interface (API) that is configured to generate spoken words based on the received navigation direction. In some embodiments, the text to speech API is one or a combination of Watson Text to Speech, Cortana text to speech, an open source text to speech API, a proprietary text to speech API, and/or any other text to speech API.

User interface controller 642 may be configured to display images on user interface 608. The images can include, for example, maps, text, arrows, and/or any other image used to display direction to an occupant of a building. In some embodiments, user interface controller 642 is configured to receive input from use interface 608. The input may be rotating a map, zooming in on a map, typing in a conference room navigation request, and any other input that can be received from user interface 608. In some embodiments, user interface controller 642 receives images to display from direction selector 644. In some embodiments, user interface controller 642 sends direction requests to direction request controller 636.

Direction selector 644 may be configured to receive directions from direction controller 628. Direction selector 644 may be configured to receive emergency directions from emergency identifier 618. In some embodiments, direction prioritization selector 646 is configured to receive the directions for directions controller 628. Direction selector 644 may be configured to prioritize the directions received from directions controller 628 and the emergency directions received from emergency identifier 618. Direction prioritization selector 646 may be configured to rank each direction request in order of highest priority. In some embodiments, directions requested via user interface 608 may have the highest priority over opportunistic directions and/or direction determined based on information from occupancy sensor 604. The ranking system may contain a queue which directions may be placed. The length of time which a direction is in the queue may factor into determining the priority for that direction. For example, a conference advertisement may be received from opportunistic controller 630 and may be placed into a display queue. The longer the advertisement sits in the queue, the higher the priority level for the advertisement may grow. When the priority level crosses a predefined level, the advertisement may be displayed and the priority level reset. In some embodiments, the priority of a direction may determine the period of time that the direction is displayed on user interface 608.

In some embodiments, direction prioritization selector 646 may provide the highest priority direction to emergency prioritization selector 648. Emergency prioritization selector may provide the directions received from direction prioritization selector 646 to user interface controller 642 if no emergency is present. If an emergency is present, emergency prioritization selector may provide the emergency directions to user interface controller 642 instead of the directions from direction prioritization selector 646. In some embodiments, emergency directions for multiple emergencies (e.g., floods, tornadoes, storms, earthquakes, etc.) may be ranked base on order of priority. For example, if emergency prioritization selector 648 receives a notification from emergency identifier 618 that there is an active shooter in the building (e.g., building 10) and a notification that there is a flooding, emergency prioritization selector 648 may rank the active shooter directions as higher priority, and may show these directions exclusively and/or for longer periods of time. In some embodiments, the highest priority emergency direction is the direction that is most likely to cause harm to occupants of the building.

In various embodiments, emergency prioritization selector 648 may combine emergency directions when occupants of the building must respond to multiple emergencies simultaneously. For example, if there is a fire and a tornado, the emergency prioritization selector 648 may combine fire response directions with tornado response directions. Emergency prioritization selector 648 may create emergency messages which tell occupants of the building to go to a certain exit. The route to the exit may bypass rooms and/or hallways with large windows. Emergency prioritization selector 648 may be able to combine any amount or type of emergency directions.

Figure 7:
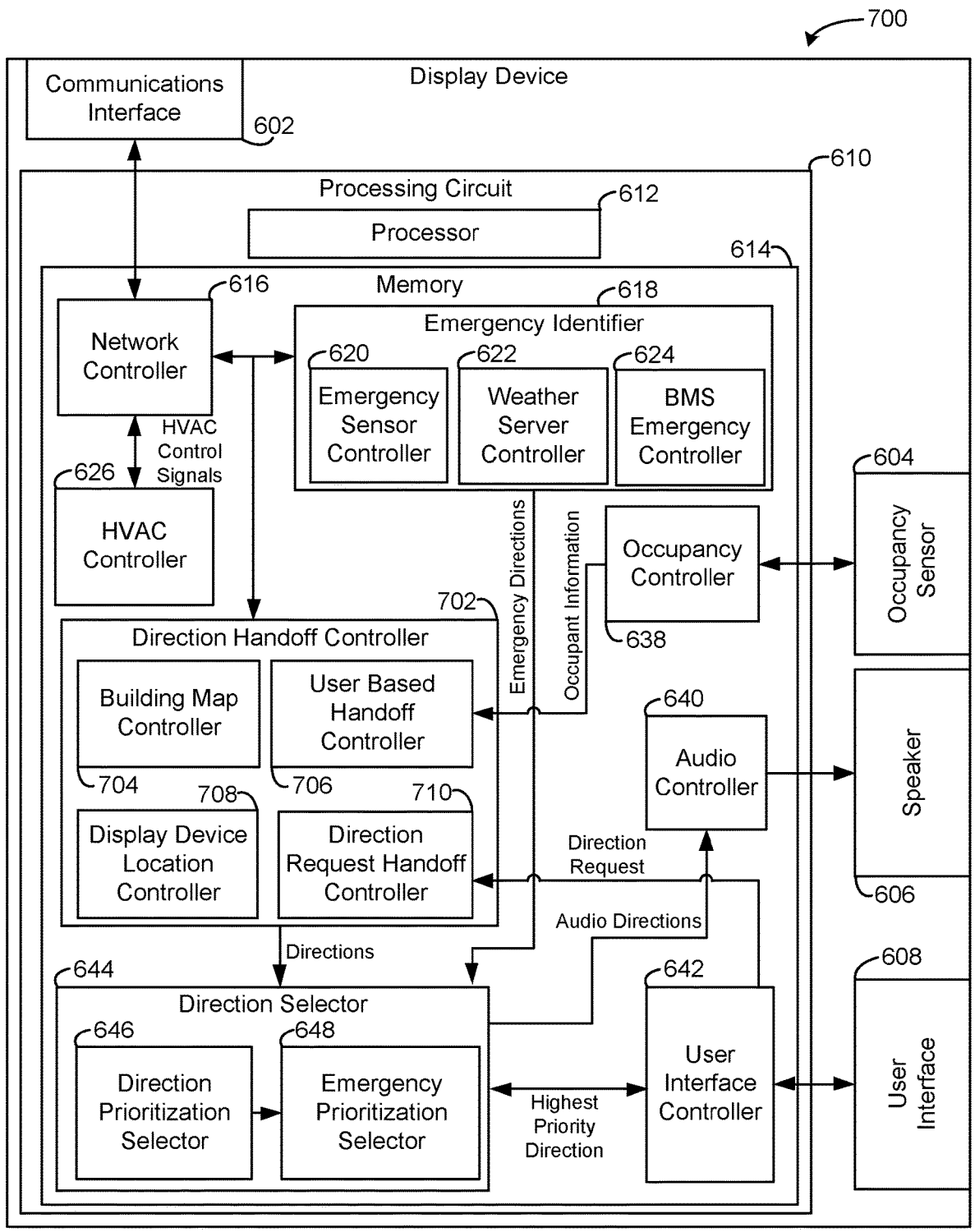
FIG. 7 is a block diagram illustrating another embodiment of the display device of FIGS. 4-5 in greater detail, according to an exemplary embodiment.

Referring now to FIG. 7, display device 700 is shown as an alternate embodiment of display device 402. Some components of display device 700 are the same as display device 402 as described with reference to FIGS. 4-6. These components include, communications interface 602, occupancy sensor 604, speaker 606, user interface 608, processing circuit 610, processor 612, memory 614, network controller 616, emergency identifier 618, emergency sensor controller 620, weather server controller 622, BMS emergency controller 624, HVAC controller 626, occupancy controller 638, audio controller 640, user interface controller 642, direction selector 644, direction prioritization selector 646, and emergency prioritization selector 648. Display device 700 is shown to further include direction handoff controller 702. In some embodiments, display device 700 has some or all of the functionality of display device 402. Direction handoff controller 702 is shown to include building map controller 704, user based handoff controller 706, direction request handoff controller 708, and display device location controller 710. Display device 700 may be configured to determine navigation direction and emergency directions as described with reference to display device 402.

In addition to determining navigation directions, emergency directions, and prioritizing directions, display device 700 may be configured to communicate with other display devices (e.g., display device 416, display device 418, etc.) and pass directions to other display devices. In some embodiments, display device 700 passes direction to other display devices that are on the route of a navigation path. In some embodiments, the direction handoff is performed via network 404 as described with reference to FIGS. 4-5. In various embodiments, the direction handoff is performed ad hoc (e.g., by sending the directions directly from display device to display device).

Building map controller 704 may be configured to maintain and/or store a building map. The building map may include multiple floors, multiple campuses, etc. Building map controller 704 may receive updates from building management system 410 via network 404. In some embodiments, building map controller 704 may be configured to receive a map when first installed in the building. In some embodiments, building map controller 704 contains the locations of all other display devices in the building. In some embodiments, building map controller 704 is configured to receive map updates from building management system 410. In various embodiments, building map controller 704 may receive notices from building management system 410 that a hallway and/or exit may be closed and/or blocked. In some embodiments, a hallway and/or exit may be blocked based on an emergency (e.g., a certain hallway is on fire and is not transmissible by an occupant. In various embodiments, a hallway and/or exit may be blocked when there are building renovations and/or repairs being done in the building.

User based handoff controller 706 may have all of the functionality of user based direction controller 632 and special needs controller 634. In addition to this functionality, user based handoff controller 706 may be configured to generate a message to send to other devices along the determined path and/or route. The other devices may be targeted based on their location along the route. Further, the time at which the user based handoff controller 706 causes the message to be sent may be based on an anticipated and/or determined walking speed of a user. For example, the message to display the directions for a user may be displayed when it is anticipated that the user will be passing the next display device based on an anticipated and/or determined walking speed. User based handoff controller 706 may cause network controller 616 and communications interface 602 to send the message to other targeted display devices.

Display device location controller 708 may be configured to maintain the location of the display device 700. In some embodiments, display device location controller 708 may perform an initial configuration routine in which the display device may prompt an installer with a building map and request that the installer identify the location of the display device 700. In some embodiments, a password may be entered via user interface 608 allowing an authorized individual to change the location of the display device 700. In various embodiments, display device location controller 708 may be configured to periodically prompt users to confirm the location of the display device 700. In various embodiments, display device location controller 708 may prompt the user by asking the user if the directions it is displaying are correct or incorrect. If the user indicates via user interface 608 that the direction displayed by display device location controller 708 are incorrect, display device location controller 708 may be configured to cause a message to be sent to building management system 410. Building management system 410 may notify a building technician that the location of display device 700 needs to be correct and/or updated.

Direction request handoff controller 710 may contain some or all of the functionality of direction request controller 636. In addition to this functionality, direction request handoff controller 710 may be configured to generate a message to send to other devices along the determined path and/or route. The other devices may be targeted based on their location along the route. Further, the time at which direction request handoff controller 710 causes the message to be sent may be based on an anticipated and/or determined walking speed of a user. For example, the message to display the directions for a user may be displayed when it is anticipated that the user will be passing the next display device based on an anticipated and/or determined walking speed. Direction request handoff controller 710 may cause network controller 616 and communications interface 602 to send the message to other targeted display devices.

Figure 8:
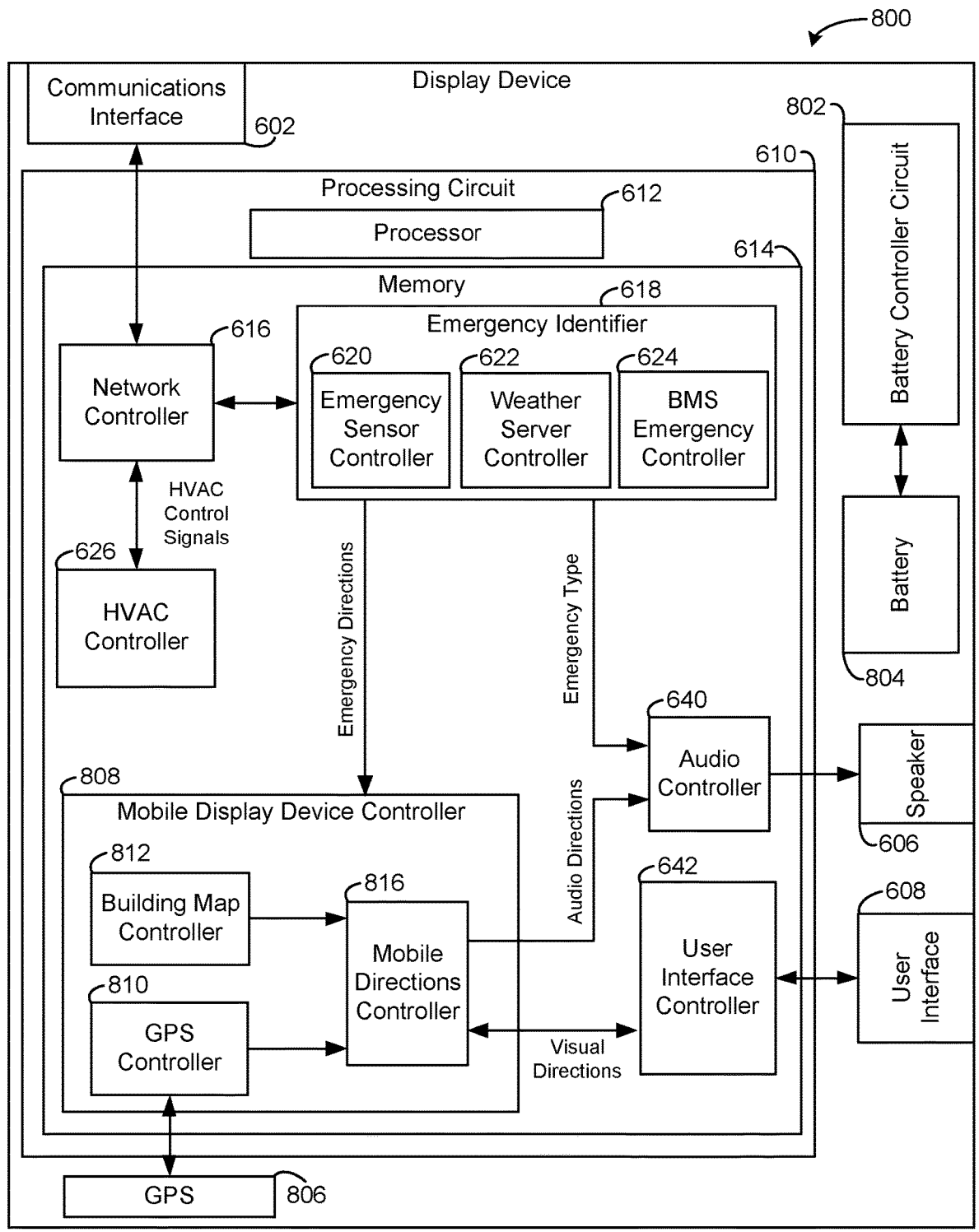
FIG. 8 is a block diagram illustrating another embodiment of the display device of FIGS. 4-5 in greater detail, according to an exemplary embodiment.

Referring now to FIG. 8, display device 800 is shown as an alternate embodiment of display device 402. In some embodiments display device 800 has some and/or all of the functionality of display device 402. Various components of display device 800 shown are the same as in display device 402 as described with reference to FIGS. 4-6. The components include communications interface 602, speaker 606, user interface 608, processing circuit 610, processor 612, memory 614, network controller 616, HVAC controller 626, emergency identifier 618, emergency sensor controller 620, weather server controller 622, BMS emergency controller 624, audio controller 640, and user interface controller 642. Display device 800 may be configured to be removed from a wall (e.g., a wall mount) in the event of an emergency. In some embodiments, display device 800 is configured to be torn off the wall. In various embodiments, display device 800 unhooks from a wall mount so that it can be easily removed. Display device 800 may provide navigation directions for evacuating a building in case of a fire, an active shooter, etc. Display device 800 is shown to include battery controller circuit 802, battery 804, and GPS 806. Memory 614 is shown to include mobile display device controller 808.

Battery controller circuit 802 is configured to charge and/or discharge battery 804. Battery controller circuit 802 may receive AC power and/or DC power. Battery controller circuit 802 may include a rectifier circuit configured to convert the AC power into DC power. In some embodiments, the rectifier is a full wave rectifier, a half wave rectifier, a full bridge rectifier, and any other type of rectifier. In some embodiments, the rectified wave is filtered to smooth out any voltage ripple present after the wave is rectified. Battery controller circuit 802 may be configured to configured to perform maximum power point tracking (MPPT) when charging the battery if the power source is a solar cell and/or solar panel. In some embodiments, battery controller circuit 802 includes circuits configured to perform slow charging (i.e. trickle charging) and/or fast charging. In some embodiments, the temperature of the battery 804 is monitored while fast charging is performed so that the battery 804 does not become damaged.

In some embodiments, the battery 804 stores charge which can be released to power display device 800. In some embodiments, battery controller circuit 802 begins discharging battery 804 when battery controller circuit detects that a wired power source of the display device 800 is removed (i.e. display device 800 is removed from the wall). Battery 804 may be any type or combination of batteries. In some embodiments, the battery is a nickel cadmium (Ni—Cd) battery and/or a nickel-metal hydride (Ni-MH) battery. In various embodiments, the battery is a lithium ion battery and/or a lithium polymer battery.

GPS 806 may be configured to determine the location of the display device 800. In some embodiments, GPS 806 determines the coordinates of display device 800. GPS 806 may send the coordinates of display device 800 to GPS controller 810. In some embodiments, GPS controller 810 logs and tracks the location of display device 800. In some embodiments, GPS controller 810 is configured to determine what direction display device 800 is moving by analyzing a plurality of GPS coordinate readings. Building map controller 812 may contain some of all of the functionality of building map controller 704 as described with reference to FIG. 7. Building map controller 812 may be configured to provide a map of the building that display device 800 is located in to mobile directions controller 816.

In some embodiments, mobile directions controller 816 generates audio directions and visual directions for display device 800. Mobile directions controller 816 may be configured to provide audio directions to audio controller 640 as described with reference to FIGS. 6-7. In various embodiments, mobile directions controller 816 may be configure to provide visual direction to user interface controller 642 as described with reference to FIGS. 6-7. Mobile direction controller 816 may be configured to generate a display for user interface 608. In some embodiments, the display may be a map displaying the location of display device 800 and a trace leading to the nearest exit.

In some embodiments, mobile directions controller 816 may be configured to determine directions based on the nature of the emergency determined by emergency identifier 618. For example, if there is a fire in the building, the mobile directions controller 816 may navigate the user holding the display device 800 to the nearest accessible exit. If the emergency is an active shooter in the building, the display device may direct the user holding display device 800 to an exit and/or may navigate the user holding display device 800 to a room that can be locked and/or easily barricaded.

In some embodiments, audio controller 640 is configured to use sound navigation when appropriate. For example, if there is an active shooter in the building, audio controller 640 may be configured to be silent so that the shooter is not alerted of the location of the user holding display device 800. In some embodiments, if there is a fire, smoke may be thick enough and/or impair the vision of the user holding display device 800. Audio controller 640 may be configured to play audio directing the user holding display device 800 to an exit without needing the user to be able to see user interface 608.

Flow Diagrams

Figure 9:
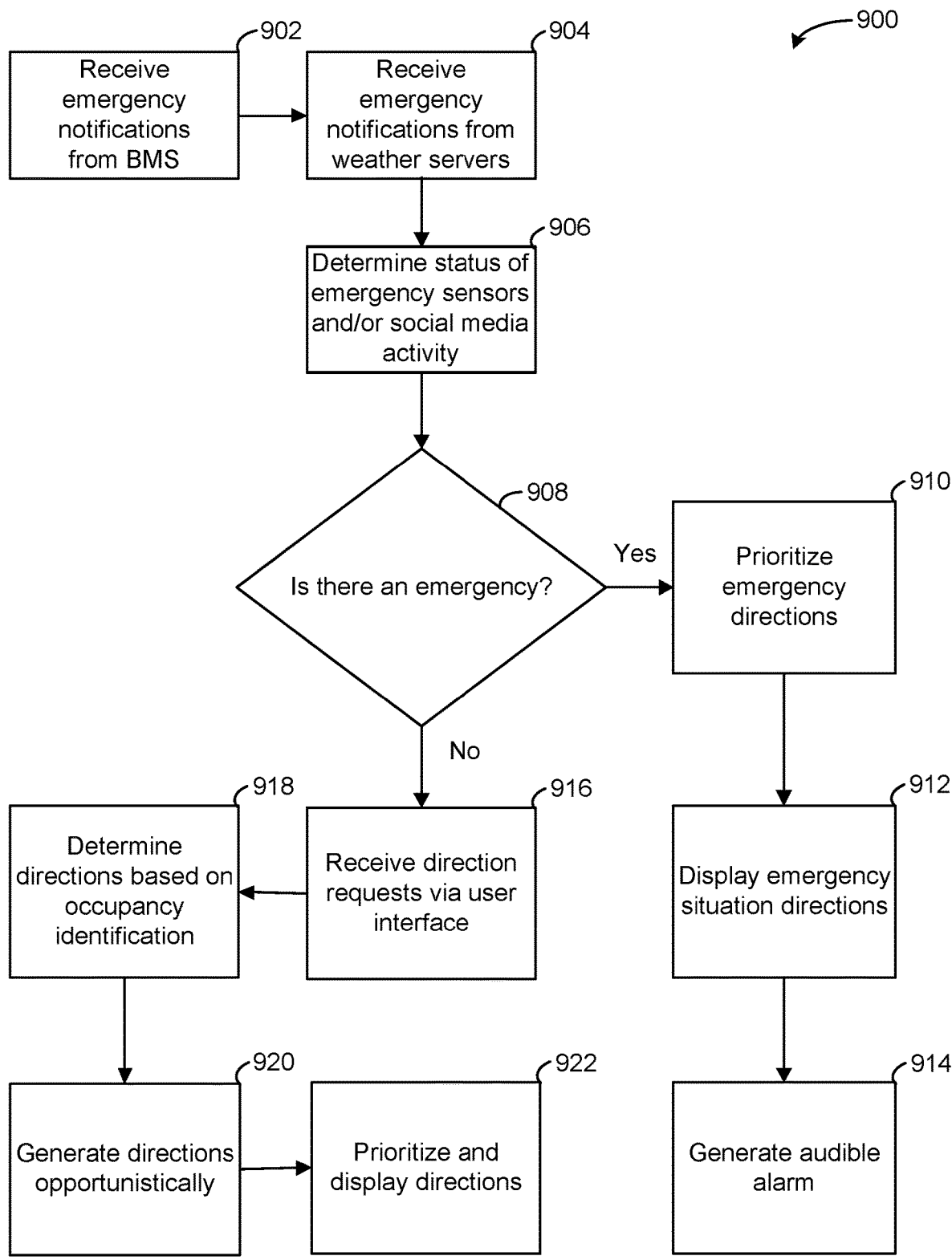
FIG. 9 is a flow diagram of operations for prioritizing directions and displaying the directions on the display device of FIGS. 4-8, according to an exemplary embodiment.

Referring now to FIG. 9, a flow diagram of process 900 for prioritizing directions for a display device is shown, according to an exemplary embodiment. In some embodiments, process 700 is performed by display device 402, as described with reference to FIGS. 4-6. In step 902, display device 402 receives emergency notifications from a BMS (e.g., building management system 410.) In some embodiments, the emergency notification is a weather related notification (winter storm watch, flooding, tornado warning, tornado watch, etc.). In some embodiments, the emergency notification is related to a building emergency (e.g., an active shooter in the building, unsafe water in the building, structurally unsafe areas of the building, etc.)

In step 904, display device 402 receives weather related emergency notifications from weather servers (e.g., weather server(s) 408.) The alert may be a winter storm watch, a flooding warning, a tornado warning, a tornado watch, etc. In step 906, display device 402 may receive and/or query emergency sensors (e.g., building emergency sensor(s) 406) for data indicating a building emergency. In some embodiments, the emergency sensors are configured to determine the nature of the emergency and provide an emergency notification directly to the display device 402. In some embodiments, the emergency notification is one or a combination of a fire, a gas leak, unsafe carbon monoxide levels, etc. At step 906, the display device 402 may also access social media server(s) 411 to receive and/or monitor data indicating or relating to a building emergency.

The display device 402 may thereby receive one or more data streams that include multiple messages indicating one or more emergencies relating to the building. The data streams may include a weather data stream indicating weather conditions associated with the building (i.e., as received from weather server(s) 408), a social media data stream indicating social media postings, comments, messages and/or other activity (i.e., as received from the social media server(s) 411, a news data stream indicating one or more events associated with the building (e.g., as received from the social media server(s) 411, the calendar application 414, the user device 412, the BMS 410, etc.), and/or other relevant data streams.

In step 908, a decision is made by display device 402 based on the presence or absence of any emergencies. That is, based on the one or more data streams received in steps 902-906, the display device 402 may determine an existence of an emergency and/or a nature or type of the emergency. If display device 402 does not determine that there is a building and/or weather related emergency in step 902, step 904, and step 906, the display device 908 may perform 916 and display non-emergency related directions. If display device 402 determines that there is a building and/or weather related emergency in step 902, step 904 and/or step 906 display device 402 may prioritize the emergency directions 910 and display emergency related directions.

In step 910, display device 402 may prioritize all the emergencies determined in step 902, step 904, and/or step 906. Display device 402 may determine the priority of emergencies based on emergency severity and/or immediate impact to occupants of a building. For example, a winter storm warning may have a lower priority than an active shooter.

In step 912, display device 402 may display the emergency directions. In some embodiments, the emergency directions are actions (e.g., emergency response directions) to take in lieu of the building and/or weather related emergency. For example, if there is a tornado, the directions may be to hide under desks and/or tables. If there is a fire, the display device 402 may display evacuation directions and/or a route to the nearest exit. If there are multiple emergencies present, the display device 402 may cycle emergencies and/or choose the most important emergency to display. In some embodiments, display device 402 generates custom directions to accommodate the proper actions to take when there are multiple emergencies. For example, if there is a fire and an active shooter present in a building, display device 402 may turn off all sound on display device 402 and display a message to the individual to keep silent. The display device 402 may then precede to direct building occupants to the nearest exits.

In step 914, the display device 402 may generate audible alarms. In some embodiments, the audible alarm may be a loudspeaker message disclosing what the emergency is and/or the proper actions to take in lieu of the emergency. In some embodiments, the audible directions are directions to the nearest exit. The directions may be "Turn left at the end of hallway and proceed to exit" and/or any other message indicating the proper directions that a user should take to evacuate the building.

If display device 402 determines that no emergencies are present in step 908, the display device may perform step 916. In step 916, display device 402 receive user direction request via a user interface. In some embodiments, a user may input a specific conference room, meeting room, and/or office.

In step 918, display device 402 may identify an occupant based on digital video processing from a camera, digital audio processing from a microphone, and/or any other processing of occupancy sensors that can be used to identify a user. In some embodiments, display device 402 stores features of users that can be matched by using digital video processing and/or digital audio processing. In some embodiments, display device 402 sends a query with identified physical features of a user to a building management system (e.g., building management system 410). The building management system may return the identity of the user. In some embodiments, the building management system may return a schedule indicating locations and times of meetings which the user may be required to attend, or which may be of interest to the user. In some embodiments, display device 402 generates navigation direction based on the identity of the user and/or based on the schedule received from the building management system.

In step 920, display device 402 may generate directions opportunistically. In some embodiments, directions may be based on events occurring in the building. In some embodiments, display device communicates with a building management system (e.g., building management system 410) and/or a building scheduler system. In some embodiments, display device 402 generates opportunistic directions based on the location of display device 402 in the building and/or the events occurring in the building. In some embodiments, display device 402 communicates with the scheduling applications of mobile devices of users in the building and/or passing by display device 402. In some embodiments, display device 402 determines what events are occurring in the building and their nature (e.g., public, private, etc.). In some embodiments, display device 402 generates directions opportunistically based on the schedules of mobile devices in the building.

In some embodiments, display device 402 prioritizes the directions determined in steps 916-920 (step 922). The directions can be ranked in order of highest priority. In some embodiments, requested directions (step 916) may have the highest priority over opportunistic directions (step 920) and/or direction determined based on information from an occupancy sensor (step 918). The ranking system may contain a queue which directions may be placed. The length of time which a direction is in the queue may factor into determining the priority for that direction. For example, if a conference advertisement is received from a building management system, the priority for displaying this advertisement may be low. In some embodiments, the priority of a direction may determine how long the direction is displayed on a user interface of display device 402. The highest priority direction may be displayed on a user interface of display device 402.

Figure 10:
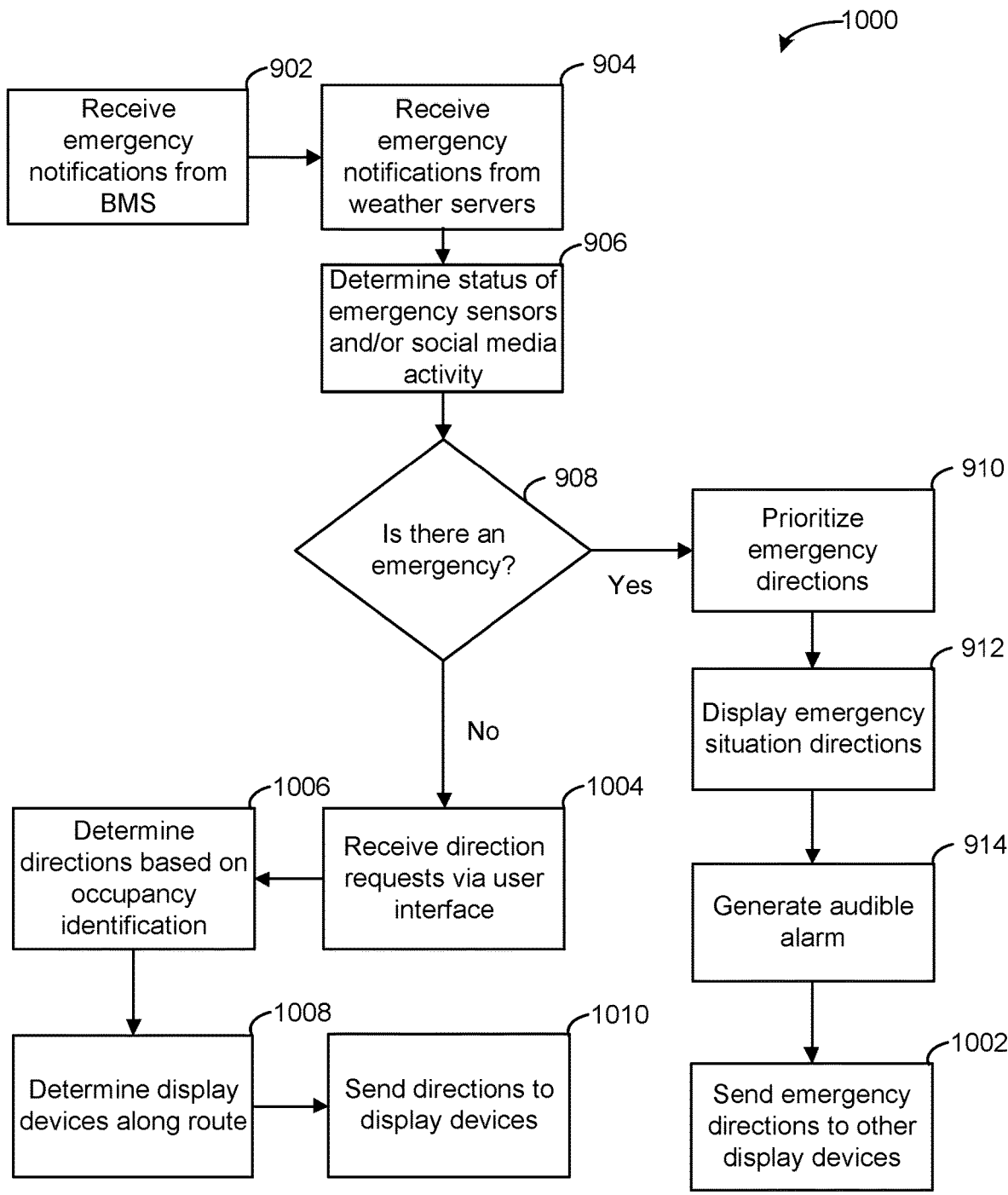
FIG. 10 is a flow diagram of operations for handing off directions between multiple display devices of FIGS. 4-8, according to an exemplary embodiment.

Referring now to FIG. 10, a flow diagram of process 1000 for handing off directions between display devices is shown, according to an exemplary embodiment. In some embodiments, process 1000 is performed by display device 700, as described with reference to FIG. 7. Process 1000 may include some or all of the steps of process 900 as described with reference to FIG. 9. In step 908, display device 700 determines if there is an emergency present in the building in which display device 700 is located. If there is an emergency, steps 910, 912, and 914 are performed as described with reference to FIG. 9.

In step 1002, display device 700 sends emergency directions to other display devices located in the building. In some embodiments, display device 700 determines where other display devices are located in the building with a display device location controller (e.g., display device location controller 708). In some embodiments, display device 700 sends the emergency directions to other devices located in the building via ad hoc communication (e.g., ad hoc Wi-Fi, ad hoc Zigbee, ad hoc Bluetooth, NFC etc.). In some embodiments, display device 700 is configured to communicate ad hoc to the other display devices. In various embodiments, display device 700 may be configured to transmit the emergency directions to the other display devices via network 404 as described with reference to FIG. 4. In some embodiments, network 404 may connect display devices on multiple floors, multiple zones, multiple buildings, and multiple campuses. In some embodiments display device 700 may send emergency directions to display devices located on a different floor than the display device 700, a different zone than the display device 700, a different building than the display device 700, and a different campus than the display device 700.

In step 908, if no emergency is present, display device 700 may receive direction requests from user interface (step 1004). In some embodiments, display device 700 may be configured to allow users to enter destinations via a touch screen user interface. In some embodiments, the destination is a conference room, a meeting room, and/or an office. Display device 700 may be configured to display an arrow, a map, turn by turn directions, and/or generate audio directions. Display device 700 may determine other display devices along the route to the destination (step 1008) and may send display directions to these devices ad hoc and/or over network 404 (step 1010).

In step 1006, display device 700 may determine directions for an occupant based on the identity of the occupant. In some embodiments, display device 700 uses at least one of a camera and/or a microphone to determine the identity of an occupant. An occupancy controller (e.g., occupancy controller 638) may be configured to identify occupants based on data received from occupancy sensors (e.g., cameras, microphones, etc.). Display device 700 may be connected to a network (e.g., network 404) and may be able to retrieve meeting information associated with the identified user. Display device 700 may be configured to display directions (arrows, turn by turn directions, maps, etc.) based on any destinations that are indicated by the identified user's meeting schedule. In some embodiments, display device 700 is configured to determine other display devices along the route to the destination (step 1008) and may send display directions to these devices ad hoc and/or over network 404 (step 1010).

Figure 11:
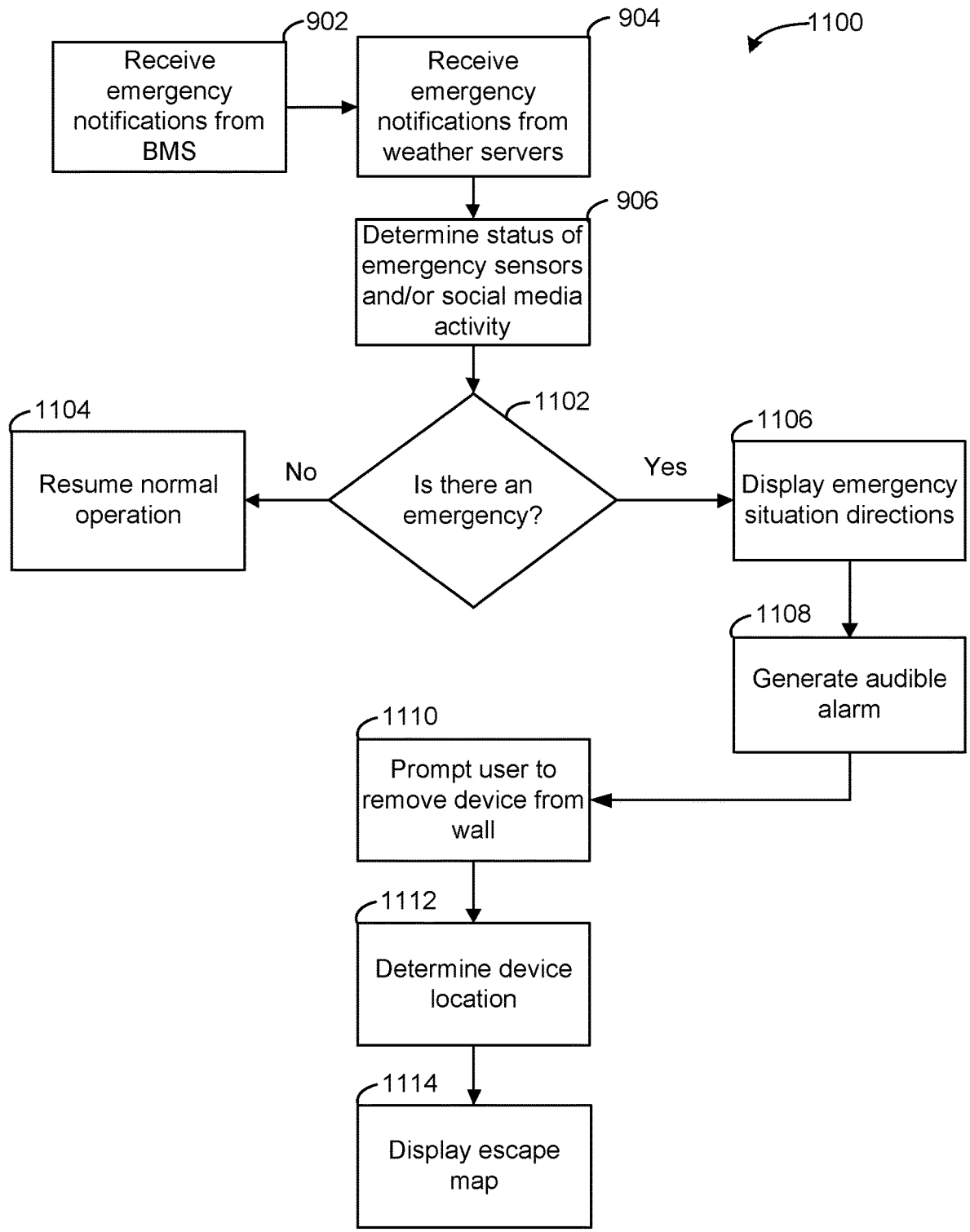
FIG. 11 is a flow diagram of operations for detaching the display device of FIGS. 4-8 from the wall in an emergency situation, according to an exemplary embodiment.

Referring now to FIG. 11, a flow diagram of process 1100 for removing a display device from a wall and using it as a map in an emergency situation, according to an exemplary embodiment. In some embodiments, process 1100 is performed by display device 800, as described with reference to FIG. 8. In step 1102, display device 800 determines if there is an emergency present in the building in which display device 800 is located. In step 1106, display device 800 determines if there is a building emergency as determined by steps 902, 904, and 906, as described with reference to FIG. 9. If there is no building and/or weather related emergency, display device 800 may resume normal operation (e.g., 1104). In some embodiments, normal operation is receiving environmental setpoints via user interface 608 and regulating environmental conditions of zones and/or a building (e.g., building 10) with HVAC controller 626. In some embodiments, normal operation is waiting for an emergency message to be received such as in steps 902, 904, and 906 as described with reference to FIG. 9.

In some embodiments, if an emergency is determined in at least one of steps 902, 904, and 906 as described with reference to FIG. 9, display device 800 displays emergency situation directions (step 1106). In some embodiments, the emergency situation directions are evacuation directions, phone numbers to call, an appropriate course of action to take, etc. In step 1108, display device 800 may generate an alarm. In some embodiments, the alarm is a siren, a building-wide message, and/or any other audible alarm.

In step 1110, display device 800 may prompt a user to remove display device 800 from the wall. In some embodiments, user interface 608 intermittently periodically displays a message "Remove From Wall For Evacuation" for a predefined duration of time. In some embodiments, the user may press a button on user interface 608 which confirms that the user has removed the device from the wall. In some embodiments, display device 800 may use GPS 806 and GPS controller 810 to determine that display device 800 has is changing location and has been removed from its original location. In some embodiments, display device 800 has a sensor such as a switch which detects that the device has been removed from the wall.

In step 1112, display device 800 may determine its current location with GPS 806. In some embodiments, GPS controller 810 may communicate with GPS 806 to determine coordinates of display device 800. In some embodiments, the coordinates are a latitude, a longitude, and an altitude. Display device 800 may be configured to use the coordinates to determine the location of the display device 800 and the user who has removed display device 800 from the wall in the building. In some embodiments, display device 800 uses GPS controller 810 to poll GPS 806 for coordinates periodically. In some embodiments, GPS controller 810 receives a new coordinate when one of the coordinates (i.e., altitude, longitude, and latitude) has changed more than a predefined amount.

In step 1114, the display device may use building map controller 812 and mobile directions controller 816 to determine a route to an evacuation point and/or a safe zone with the GPS coordinates of GPS controller 810. In some embodiments, user interface controller 642 may display the location of the user on user interface 608 and a map with a route indicating the necessary directions to take to reach the evacuation point and/or safe zone.

Figure 12:
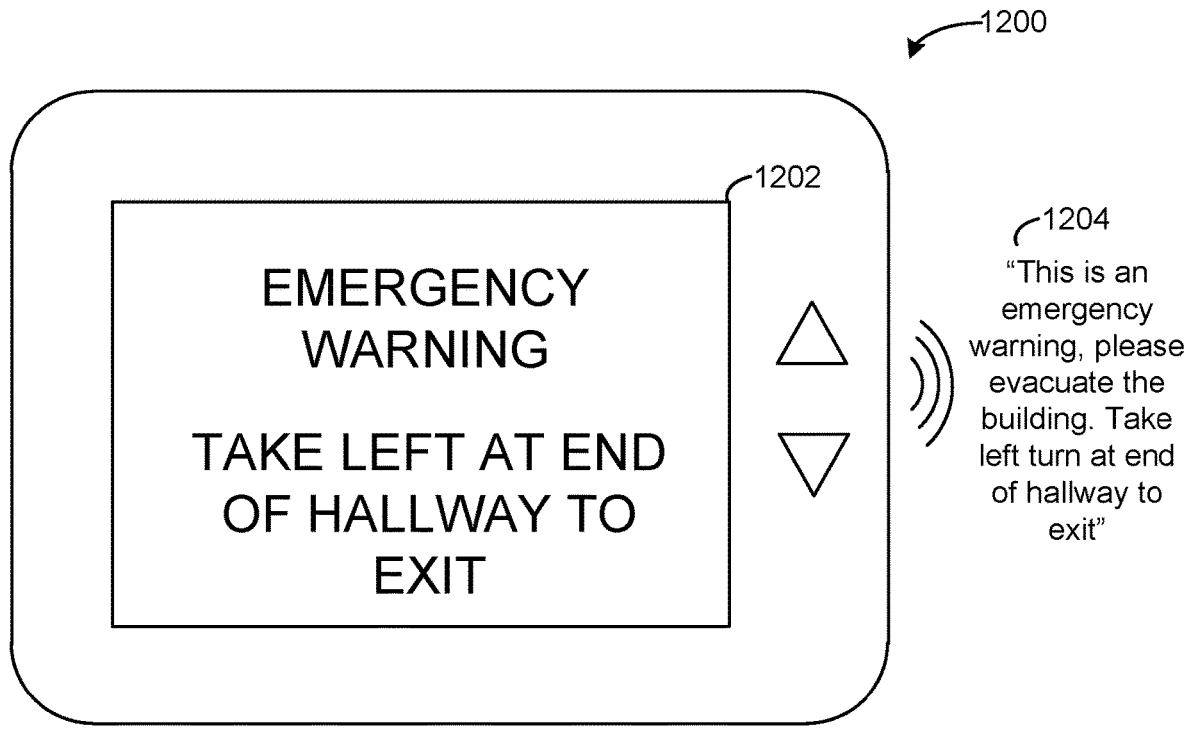
FIG. 12 is a drawing of the display device of FIGS. 4-8 displaying an emergency warning, according to an exemplary embodiment.

Referring now to FIG. 12, a drawing 1200 of an emergency display for display device 402 is shown, according to an exemplary embodiment. In some embodiments, display device 402 is configured to display emergency directions on user interface 608. Emergency directions 1202 display text based directions for exiting a building. In some embodiments, the directions may be map based. Map based directions may allow an individual to see their current location on a map and a route to the nearest exit, evacuation zone, and/or safe zone. Audio 1204 may be broadcast by display device 402 to accompany the visual emergency message. In some embodiments audio 1204 is broadcast via speaker 606. The emergency audio, audio 1204, may give audible directions to occupants of the building to evacuate. In some embodiments, audio 1204 may give occupants of the buildings evacuation directions and/or directions to a safe zone.

Figure 13:
FIG. 13 is a drawing of the display device of FIGS. 4-8 displaying a building event notification, according to an exemplary embodiment.

Referring now to FIG. 13, a drawing 1300 of an opportunistic display for display device 402 is shown, according to an exemplary embodiment. In some embodiments, the opportunistic message may be a message generated and/or determined by opportunistic controller 630 as described with reference to FIGS. 6-8. In some embodiments, display device 402 is configured to display opportunistic messages and opportunistic directions on user interface 608. Opportunistic message 1302 displays advertises a building event and display directions to said building event. The advertisement may include a logo, the location of an event, a cost of an event, and/or any other information that could be used in the advertisement. Audio 1304 may be broadcast by display device 402 to accompany the opportunistic message. In some embodiments audio 1204 is broadcast via speaker 606. The opportunistic audio message, audio 1204, may give audible directions to occupants of the building to report to certain rooms, floors, building, and/or any other location. In some embodiments, audio 1304 is music and/or any other audio based message or sound.

Figure 14:
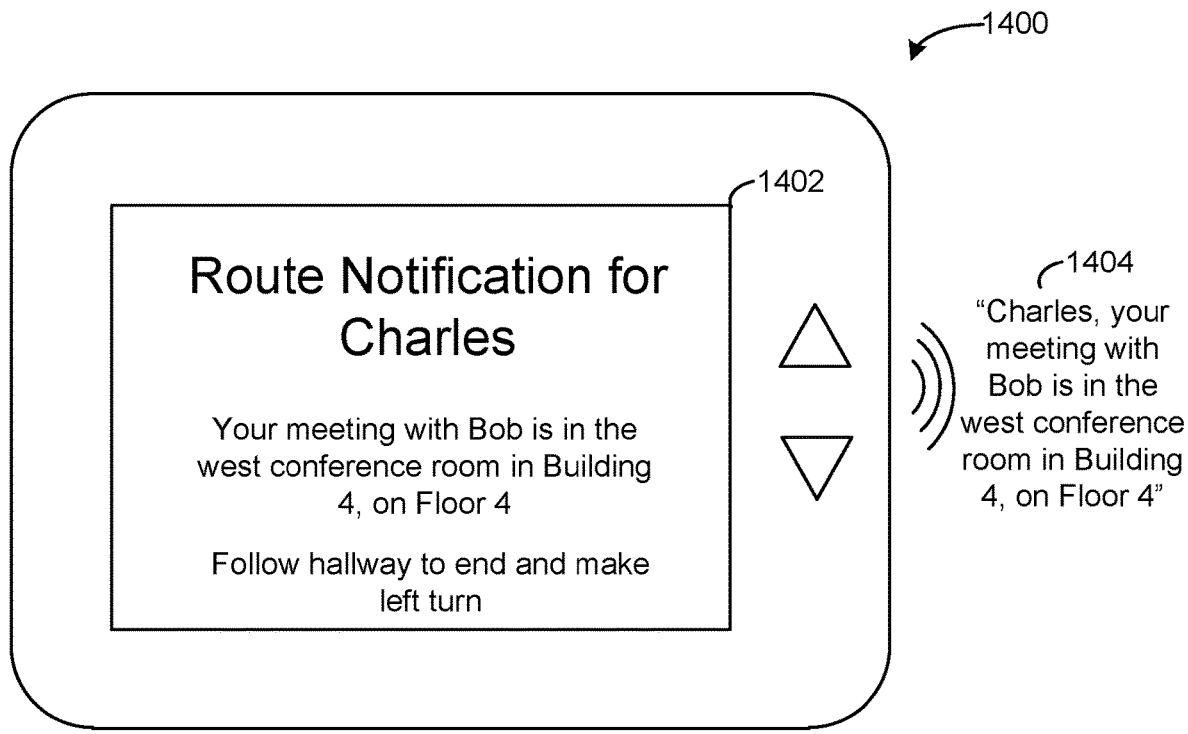
FIG. 14 is a drawing of the display device of FIGS. 4-8 displaying a route notification, according to an exemplary embodiment.

Referring now to FIG. 14, a drawing 1400 of a route notification for display device 402 and/or display device 700 is shown, according to an exemplary embodiment. In some embodiments, display device 402 and/or display device 700 is configured to display directions on user interface 608. In some embodiments, the directions are for an identified and/or tracked occupant. Direction message 1402 may include the name of the occupant being given directions. In some embodiments, direction message 1402 includes a route destination (e.g., "West Conference room in Building 4, on Floor 4"). Further, directions may be given to the occupant. The directions may be the appropriate turns to take to reach a location (e.g., "follow hallway to end and make left turn").

In some embodiments, audio 1404 may be broadcast by display device 402 and/or display device 700 to accompany the direction message 1402. In some embodiments audio 1404 is broadcast via speaker 606. The audio 1404 may give audible directions to occupants of the building to report to certain rooms, floors, building, and/or any other location. In some embodiments, audio 1404 is music and/or any other audio based message or sound. Audio 1404 may identify an occupant by name and/or handle before playing directions for the occupant.

Figure 15:
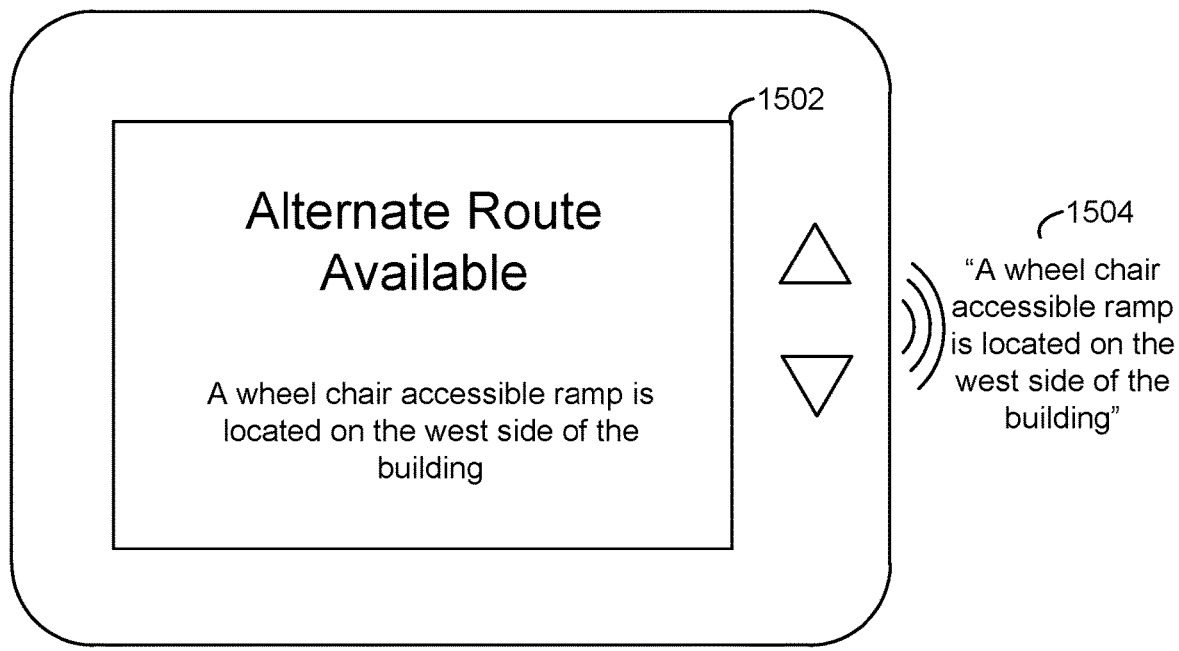
FIG. 15 is a drawing of the display device of FIGS. 4-8 displaying a handicap route notification, according to an exemplary embodiment.

Referring now to FIG. 15, a drawing 1500 of an alternate route notification for display device 402 and/or display device 700 is shown, according to an exemplary embodiment. In some embodiments, display device 402 and/or display device 700 is configured to display alternate route directions on user interface 608. In some embodiments, the directions are for an identified and/or tracked occupant. In some embodiments, the identified and/or tracked occupant has a known disability. Alternate route message 1502 may give directions to an occupant of an alternate route based on the disability of the occupant. For example, the route may direct an occupant to a wheelchair ramp instead of a staircase if the identified occupant has crutches, a wheelchair, and/or any other disability prohibiting the occupant from ascending and/or descending stairs.

In some embodiments, audio 1504 may be broadcast by display device 402 and/or display device 700 to accompany the alternate route message 1502. In some embodiments audio 1504 is broadcast via speaker 606. The audio 1504 may give audible directions to occupants of alternate routes. In some embodiments, the audio 1504 may direct an occupant to a wheelchair accessible ramp. In some embodiments, audio 1504 is music and/or any other audio based message or sound. Audio 1504 may identify an occupant by name and/or handle before playing directions for the alternate route.

Figure 16:
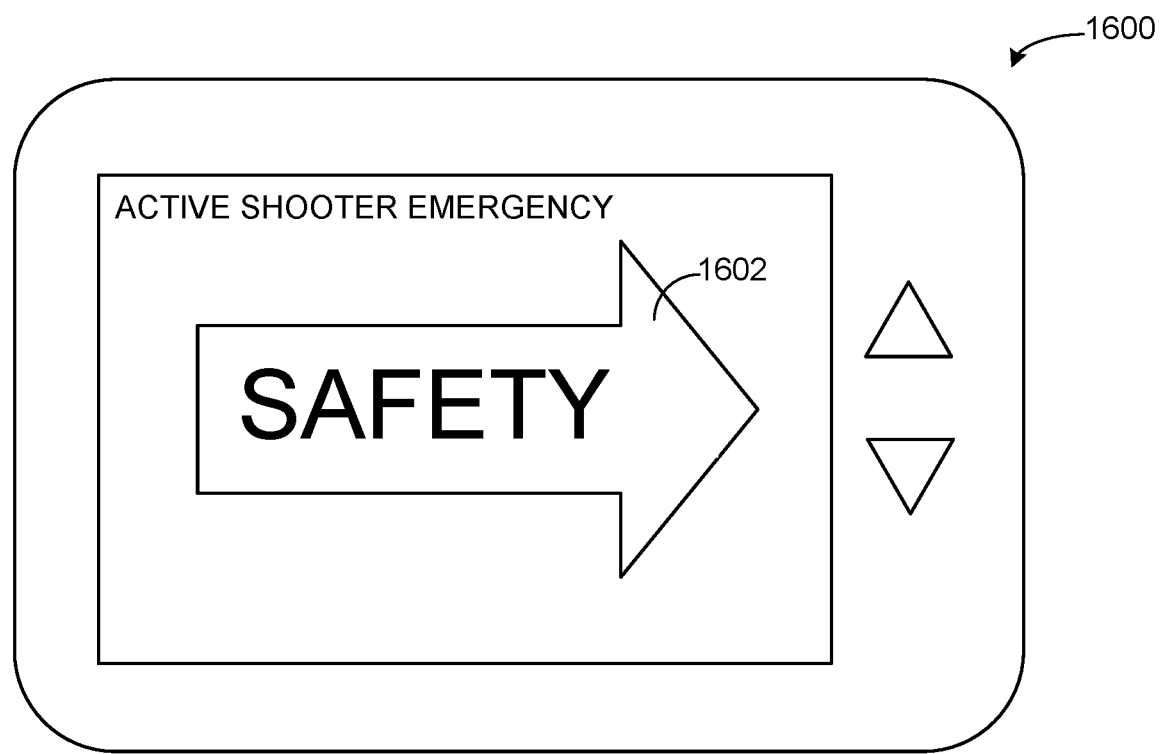
FIG. 16 is a drawing of the display device of FIGS. 4-8 displaying an emergency direction, according to an exemplary embodiment.

Referring now to FIG. 16, a drawing 1600 of another alternate route notification for display device 402 and/or display device 700 is shown, according to an exemplary embodiment. In the embodiment shown, display device 402 (and/or display device 700 and/or display device 800) is configured to display an arrow 1602 that points in a direction that a user/occupant of the building should move to avoid an emergency. More particularly, in the example shown, the arrow 1602 points away from a location of an active shooter detected by the building emergency sensor(s) 406. In such an example, the display device 402 determines a route based on a location of the active shooter and a building map or floorplan to determine a safe direction for an occupant to travel. The arrow 1602 thereby directs the occupant in a safe direction (e.g., away from danger). In some embodiments, the arrow 1602 may be updated to point in various directions in real time as the location of the active shooter detected by the building emergency sensor(s) 406 changes. The display device 402 and/or display device 700 thereby facilitates a user in fleeing an active shooter.

More particularly, in the example of FIG. 16, the processing circuit 610 of the display device 402 may receive, via the communications interface 602, a first indication of a first location of a shooter from a shot detection system. The shot detection system may be included with the building emergency sensors 406 and may be configured to detect a gunshot in the building and determine a location of the gunshot in the building. The processing circuit 610 may determine and escape route, an evacuation route, or other route to safety based on the first location of the shooter, the location of the display device 402, and the location of one or more additional display devices (e.g., display device 416, display device 418), and a floor plan of the building, A first navigation direction may be displayed on the display device 410 (e.g., as shown in FIG. 16) to direct a user along a route that avoids the shooter within the building. A second navigation direction may be displayed on a second display device (e.g., display device 416, display device 418) to show a user a next step on the safe route to avoid the shooter.

In some cases, the shooter may move within the building. The shot detection system 406 may detect a second location of a gunshot and provide the second location to the display device 402. The display device may then update the escape route and the associated navigations directions on the display device 402 and on the one or more additional display devices (e.g., display device 416, display device 418) to direct the user along an update route that avoids the second location. The user may thereby be guided to safety along a route that avoids the active shooter in the building. For example, with reference to FIG. 16, the arrow 1602 may be updated to point in a new direction (e.g., switched from pointing right to pointing left) when the gunman is detected as relocating to the right of the display device 402.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A first thermostat of a building, the first thermostat comprising:
   a communications interface configured to communicate with at least one of a second thermostat or a network server;
   a user interface configured to display information to a user; and
   a processing circuit configured to:
      receive, via the communications interface, an indication of an emergency relating to the building;
      generate building navigation direction data for user navigation through the building based on the indication of the emergency;
      cause the user interface to display a first building navigation direction based on the building navigation direction data; and
      cause, via the communications interface, the second thermostat to display a second building navigation direction on a second display of the second thermostat based on the building navigation direction data, wherein the first building navigation direction and the second building navigation direction direct the user to follow an evacuation route, wherein the first thermostat and the second thermostat are positioned along the evacuation route.

2. The first thermostat of claim 1, wherein the processing circuit is configured to cause, via the communications interface, the second thermostat to display the second building navigation direction on the second display of the second thermostat by communicating with at least one of the second thermostat or the network server via the communications interface.

3. The first thermostat of claim 1, wherein the first thermostat is mounted on a first wall of the building and the second thermostat is mounted on a second wall of the building, wherein the first thermostat and the second thermostat are configured to control environmental conditions of the building by generating control signals for controlling building equipment.

4. The first thermostat of claim 1, wherein the processing circuit is configured to:
   receive, via the communications interface, the indication of the emergency from at least one of a wearable device of an occupant of the building or a hand held device of the occupant of the building, the indication indicating that the occupant is experiencing a health emergency and comprising an occupant location of the occupant in the building; and
   generate the building navigation direction data based on the occupant location of the occupant, a first thermostat location of the first thermostat, and a second thermostat location of the second thermostat;
   wherein the first building navigation direction and the second building navigation direction direct a caregiver towards the occupant location of the occupant.

5. The first thermostat of claim 1, wherein the indication of the emergency comprises a first location of an active shooter in the building as determined by a shot detection system configured to detect the first location of the active shooter within the building; and
   the processing circuit is configured to:
      generate the building navigation data based on a first thermostat location of the first thermostat, a second thermostat location of the second thermostat, and the first location of the active shooter;
      determine, based on the building navigation data, the first building navigation direction and the second building navigation direction, wherein the first building navigation direction and the second building navigation direction direct a user to evacuate the building on a first route that avoids the shooter within the building;
      receive, via the communications interface, a second indication of the emergency comprising a second location of the active shooter in the building; and
      update the first building navigation direction and the second building navigation direction based on the first thermostat location of the first thermostat, the second thermostat location of the second thermostat, and the second location of the active shooter, wherein an updated first building navigation direction and an updated second building navigation direction direct the user to evacuate the building on a second route that avoids the shooter within the building.

6. The first thermostat of claim 1, wherein the processing circuit is further configured to:
   receive, via the communications interface, a second indication of a second emergency relating to the building;
   determine that the second emergency has a higher priority than the emergency relating to the building; and
   generate the building navigation data based on the second indication of the second emergency.

7. The first thermostat of claim 1, wherein the processing circuit is configured to:
   receive one or more data streams via the communications interface, the one or more data streams comprising a plurality of messages indicating the emergency associated with the building;
   analyze the one or more data streams to identify a type of emergency within the building; and
   generate the building navigation data based on the received one or more data streams and the type of emergency within the building.

8. The first thermostat of claim 7, wherein the one or more data streams comprise at least one of a weather data stream indicating weather conditions associated with the building, a news data stream indicating one or more events associated with the building, or a social media data stream indicating one or more social media postings or comments indicating the emergency.

9. A method for displaying navigation directions in a building, comprising:
   providing a communication session between a first thermostat of the building and at least one of a second thermostat or a network server;
   receiving one or more data streams via a communications interface, the one or more data streams comprising a plurality of messages indicating an emergency associated with the building;
   analyzing the one or more data streams to identify a type of emergency within the building;
   generating, by the first thermostat, building navigation direction data for user navigation through the building based on the one or more data streams and the type of emergency within the building;
   displaying, on a first display of the first thermostat, a first building navigation direction based on the building navigation direction data; and causing, by the first thermostat, a second display of the second thermostat to display a second building navigation direction based on the building navigation direction data.

10. The method of claim 9, wherein causing, by the first thermostat, the second display of the second thermostat to display the second building navigation direction comprises communicating, by the first thermostat, with at least one of the second thermostat or the network server via the communication session.

11. The method of claim 9, further comprising controlling, by the first thermostat and the second thermostat, environmental conditions of the building by generating control signals for controlling building equipment.

12. The method of claim 9, comprising:
receiving, by the first thermostat, a first indication of the emergency relating to the building; and
generating, by the first thermostat, the building navigation data based on an indication of the emergency.

13. The method of claim 12, wherein the indication of the emergency comprises a first location of an active shooter in the building as determined by a shot detection system configured to detect the first location of the active shooter within the building, the method further comprising:
generating the building navigation data based on a first thermostat location of the first thermostat, a second thermostat location of the second thermostat, and the first location of the active shooter;
determining, based on the building navigation data, the first building navigation direction and the second building navigation direction, wherein the first building navigation direction and the second building navigation direction direct a user to evacuate the building on a first route that avoids the shooter within the building;
receiving, via the communications interface, a second indication of the emergency comprising a second location of the active shooter in the building; and
updating the first building navigation direction and the second building navigation direction based on the first thermostat location of the first thermostat, the second thermostat location of the second thermostat, and the second location of the active shooter, wherein an updated first building navigation direction and an updated second building navigation direction direct the user to evacuate the building on a second route that avoids the shooter within the building.

14. The method of claim 13, further comprising:
receiving, by the first thermostat, a second indication of a second emergency relating to the building;
determining, by the first thermostat, that the emergency has a higher priority than the second emergency; and
generating the building navigation data based on an indication of the second emergency in response to determining that the emergency has a higher priority than the second emergency.

15. A system for displaying navigation directions in a building, the system comprising:
an emergency sensor configured to provide data relating to an emergency in the building; and
a first thermostat comprising:
a communications interface configured to communicate with at least one of the emergency sensor, a second thermostat, or a network server;
a user interface configured to display information to a user and receive input from the user; and
a processing circuit configured to:
receive, from the emergency sensor, the data relating to the emergency;
generate building navigation direction data for user navigation through the building based on the data provided by the emergency sensor;
cause the user interface to display a first building navigation direction based on the building navigation direction data; and
cause, via the communications interface, the second thermostat to display a second building navigation direction on a second display of the second thermostat based on the building navigation direction data, wherein the first building navigation direction and the second building navigation direction direct a user to follow an evacuation route, wherein the first thermostat and the second thermostat are positioned along the evacuation route.

16. The system of claim 15, wherein the processing circuit is configured to cause, via the communications interface, the second thermostat to display the second building navigation direction on the second display of the second thermostat by communicating with at least one of the second thermostat or the network server via the communications interface.

17. The system of claim 15, wherein the data provided by the emergency sensor comprises an indication of a location of the emergency in the building; and
wherein the first building navigation direction and the second building navigation direction direct a user to follow an evacuation route that avoids the location of the emergency.

18. A first thermostat of a building, the first thermostat comprising:
a communications interface configured to communicate with at least one of a second thermostat or a network server;
a user interface configured to display information to a user; and
a processing circuit configured to:
receive, via the communications interface, an indication of an emergency relating to the building from at least one of a wearable device of an occupant of the building or a hand held device of the occupant of the building, the indication indicating that the occupant is experiencing a health emergency and comprising a location of the occupant in the building;
generate building navigation direction data for user navigation through the building based on the indication of the emergency and further based on the location of the occupant, a first thermostat location of the first thermostat, and a second thermostat location of the second thermostat;
cause the user interface to display a first building navigation direction based on the building navigation direction data; and
cause, via the communications interface, the second thermostat to display a second building navigation direction on a second display of the second thermostat based on the building navigation direction data, wherein the first building navigation direction and the second building navigation direction direct a caregiver towards the location of the occupant.

19. The first thermostat of claim 18, wherein the processing circuit is configured to cause, via the communications interface, the second thermostat to display the second building navigation direction on the second display of the second thermostat by communicating with at least one of the second thermostat or the network server via the communications interface.

20. A first thermostat of a building, the first thermostat comprising:
    a communications interface configured to communicate with at least one of a second thermostat or a network server;
    a user interface configured to display information to a user; and
    a processing circuit configured to:
        receive, via the communications interface, an indication of an emergency relating to the building, wherein the indication of the emergency comprises a first location of an active shooter in the building as determined by a shot detection system configured to detect the first location of the active shooter within the building;
        generate building navigation direction data for user navigation through the building based on the indication of the emergency and further based on a first thermostat location of the first thermostat, a second thermostat location of the second thermostat, and the first location of the active shooter, the building navigation direction data comprising a first building navigation direction and a second building navigation direction;
        determine, based on the building navigation data, the first building navigation direction and the second building navigation direction, wherein the first building navigation direction and the second building navigation direction direct a user to evacuate the building on a first route that avoids the shooter within the building;
        receive, via the communications interface, a second indication of the emergency comprising a second location of the active shooter in the building;
        update the first building navigation direction and the second building navigation direction based on the first thermostat location of the first thermostat, the second thermostat location of the second thermostat, and the second location of the active shooter, wherein an updated first building navigation direction and an updated second building navigation direction direct the user to evacuate the building on a second route that avoids the shooter within the building;
        cause the user interface to display the updated first building navigation direction based on the building navigation direction data; and
        cause, via the communications interface, the second thermostat to display the updated second building navigation direction on a second display of the second thermostat based on the building navigation direction data.

21. The first thermostat of claim 20, wherein the processing circuit is configured to:
    receive one or more data streams via the communications interface, the one or more data streams comprising a plurality of messages indicating an emergency associated with the building;
    analyze the one or more data streams to identify a type of emergency within the building; and
    generate the building navigation data based on the received one or more data streams and the type of emergency within the building.

22. A first thermostat of a building, the first thermostat comprising:
    a communications interface configured to communicate with at least one of a second thermostat or a network server;
    a user interface configured to display information to a user; and
    a processing circuit configured to:
        receive, via the communications interface, an indication of a first emergency relating to the building;
        receive, via the communications interface, a second indication of a second emergency relating to the building;
        determine that the second emergency has a higher priority than the first emergency;
        generate building navigation direction data for user navigation through the building based on the second indication of the second emergency;
        cause the user interface to display a first building navigation direction based on the building navigation direction data; and
        cause, via the communications interface, the second thermostat to display a second building navigation direction on a second display of the second thermostat based on the building navigation direction data.

23. The first thermostat of claim 22, wherein the first thermostat is mounted on a first wall of the building and the second thermostat is mounted on a second wall of the building, wherein the first thermostat and the second thermostat are configured to control environmental conditions of the building by generating control signals for controlling building equipment.

24. A method for displaying navigation directions in a building, comprising:
    providing a communication session between a first thermostat of the building and at least one of a second thermostat or a network server;
    receiving, by the first thermostat, a first indication of a first emergency relating to the building;
    receiving, by the first thermostat, a second indication of a second emergency relating to the building, wherein the second indication of the second emergency comprises a first location of an active shooter in the building as determined by a shot detection system configured to detect a location of the active shooter within the building;
    determining, by the first thermostat, that the second emergency has a higher priority than the first emergency;
    generating, by the first thermostat, building navigation direction data for user navigation through the building based on the second indication of the second emergency and further based on a first thermostat location of the first thermostat, a second thermostat location of the second thermostat, and the first location of the active shooter;
    determining, based on the building navigation data, first building navigation direction and second building navigation direction, wherein the first building navigation direction and the second building navigation direction direct a user to evacuate the building on a first route that avoids the shooter within the building;
    receiving, via a communication interface, another indication of the second emergency comprising a second location of the active shooter in the building;
    updating the first building navigation direction and the second building navigation direction based on the first thermostat location of the first thermostat, the second thermostat location of the second thermostat, and the second location of the active shooter, wherein an updated first building navigation direction and an updated second building navigation direction direct the user to evacuate the building on a second route that avoids the shooter within the building;

displaying, on a first display of the first thermostat, the updated first building navigation direction based on the building navigation direction data; and causing, by the first thermostat, a second display of the second thermostat to display the updated second building navigation direction based on the building navigation direction data.

25. The method of claim 24, wherein causing, by the first thermostat, the second display of the second thermostat to display the updated second building navigation direction comprises communicating, by the first thermostat, with at least one of the second thermostat or the network server via the communication session.

* * * * *